United States Patent [19]

Yahav et al.

[11] Patent Number: 5,070,222
[45] Date of Patent: Dec. 3, 1991

[54] HEATING SYSTEM EMPLOYING AN INDUCTION PRODUCING ELEMENT AND A HIGH PERMEABILITY FOIL

[75] Inventors: Shimon Yahav, Rehovot; Yair Daar, Moshav Galia, both of Israel

[73] Assignee: Lancet S.A., Piso, Panama

[21] Appl. No.: 406,568

[22] Filed: Sep. 13, 1989

[30] Foreign Application Priority Data

May 23, 1989 [IL] Israel .......................................... 90382

[51] Int. Cl.⁵ ............................................. H05B 6/12
[52] U.S. Cl. ............................. 219/10.493; 219/10.67;
219/10.77; 219/10.79; 99/451; 99/DIG. 14;
99/348
[58] Field of Search ...................... 219/10.493, 10.491,
219/10.67, 10.75, 10.77, 10.79; 99/348, 451;
DIG. 14; 126/390

[56] References Cited

U.S. PATENT DOCUMENTS

| | | |
|---|---|---|
| 774,350 | 3/1904 | Castle . |
| 792,721 | 6/1905 | McCarty . |
| 1,109,210 | 9/1914 | Dorr . |
| 1,170,169 | 2/1916 | Shailor . |
| 1,491,991 | 4/1924 | Lacy . |
| 1,567,679 | 12/1925 | Rittman et al. . |
| 1,642,531 | 9/1927 | Barnard . |
| 1,674,692 | 6/1928 | McHugh . |
| 1,711,955 | 5/1929 | Larson . |
| 1,786,877 | 12/1930 | Thompson . |
| 1,790,115 | 1/1931 | Sells . |
| 1,901,314 | 7/1930 | McArdie . |
| 2,436,585 | 2/1948 | Mangold . |
| 2,600,486 | 6/1952 | Cox . |
| 3,232,210 | 2/1966 | Ogle . |
| 3,237,924 | 3/1966 | Soper . |
| 3,407,872 | 10/1968 | Crane . |
| 3,505,498 | 4/1970 | Shevlin . |

(List continued on next page.)

FOREIGN PATENT DOCUMENTS

| | | |
|---|---|---|
| 344289 | 7/1987 | Austria . |
| 0300306 | 1/1989 | European Pat. Off. . |
| 920500 | 11/1954 | Fed. Rep. of Germany . |
| 3346016 | 11/1984 | Fed. Rep. of Germany . |
| 2614766 | 5/1987 | France . |
| 314030 | 6/1929 | United Kingdom . |
| 354869 | 5/1930 | United Kingdom . |
| 421697 | 12/1934 | United Kingdom . |
| 482544 | 3/1938 | United Kingdom . |
| 743322 | 1/1956 | United Kingdom . |
| 846310 | 8/1960 | United Kingdom . |
| 1154821 | 6/1969 | United Kingdom . |
| 1436207 | 5/1976 | United Kingdom . |
| 1473131 | 5/1977 | United Kingdom . |
| 2173051 | 10/1986 | United Kingdom . |
| 2177267 | 1/1987 | United Kingdom . |
| 2178910 | 2/1987 | United Kingdom . |
| 2186184 | 8/1987 | United Kingdom . |
| 2195524 | 4/1988 | United Kingdom . |
| 2196238 | 4/1988 | United Kingdom . |
| 2208332 | 3/1989 | United Kingdom . |
| 2208336 | 3/1989 | United Kingdom . |
| 85/05528 | 5/1985 | World Int. Prop. O. . |

*Primary Examiner*—Philip H. Leung
*Attorney, Agent, or Firm*—Finnegan, Henderson, Farabow, Garrett & Dunner

[57] ABSTRACT

A domestic cooking system including at least one cooking utensil defining a food heating surface and including heating apparatus operative to heat the food heating surface by thermal conduction, and a base defining one or more cooking locations arranged for removable engagement with at least one cooking utensil and including apparatus for providing energy to the heating apparatus including an electrical connector disposed at at least one of the cooking locations and configured for mating engagement with at least one of the utensils. There is also provided a domestic cooking system including a base defining at least one cooking location and including electromagnetic induction apparatus including an induction producing element operative to generate electromagnetic flux and at least one high permeability foil disposed so as to direct electromagnetic flux generated by the induction producing element to the cooking location.

43 Claims, 25 Drawing Sheets

U.S. PATENT DOCUMENTS

| | | |
|---|---|---|
| 3,635,147 | 1/1972 | Lee . |
| 3,722,399 | 3/1973 | Cole . |
| 3,745,290 | 7/1973 | Harnden, Jr. et al. ......... 219/10.493 |
| 3,761,668 | 9/1973 | Harnden, Jr. et al. ......... 219/10.493 |
| 3,777,094 | 12/1973 | Peters, Jr. ...................... 219/10.493 |
| 3,786,740 | 1/1974 | Martin . |
| 3,842,241 | 10/1975 | Isaacson et al. . |
| 3,869,596 | 2/1975 | Howie . |
| 3,919,763 | 11/1975 | Ulam . |
| 3,979,572 | 9/1976 | Ito et al. ......................... 219/10.493 |
| 4,020,310 | 4/1977 | Souder, Jr. et al. ........... 219/10.493 |
| 4,038,518 | 7/1977 | Morton et al. ................. 219/10.493 |
| 4,063,068 | 12/1977 | Johnson et al. . |
| 4,073,225 | 2/1978 | Lang-Ree . |
| 4,149,455 | 4/1979 | Ross . |
| 4,217,481 | 8/1980 | Fischer . |
| 4,397,874 | 8/1983 | Piotkowski . |
| 4,415,788 | 11/1983 | Field ............................... 219/10.493 |
| 4,417,506 | 11/1983 | Herbst et al. . |
| 4,435,638 | 12/1983 | Simon et al. . |
| 4,458,139 | 7/1984 | McClean . |
| 4,467,162 | 8/1984 | Kondo et al. .................... 219/10.79 |
| 4,511,781 | 4/1985 | Tucker et al. .................... 219/10.77 |
| 4,576,089 | 3/1986 | Chauvin .............................. 99/348 |
| 4,596,913 | 6/1986 | Takechi et al. ...................... 219/8.5 |
| 4,629,843 | 12/1986 | Kato et al. ..................... 219/10.493 |
| 4,649,810 | 3/1987 | Wong . |
| 4,667,074 | 5/1987 | Kubo et al. .................... 219/10.493 |
| 4,693,610 | 9/1987 | Weiss . |
| 4,717,812 | 1/1988 | Makita . |
| 4,763,567 | 8/1988 | Dalquist, III et al. . |
| 4,763,570 | 8/1988 | Bellanca . |
| 4,816,647 | 3/1989 | Payne . |
| 4,817,510 | 4/1989 | Kowalics et al. ...................... 99/348 |
| 4,820,054 | 4/1989 | Wong . |
| 4,910,372 | 3/1990 | Vukich ............................. 219/10.67 |

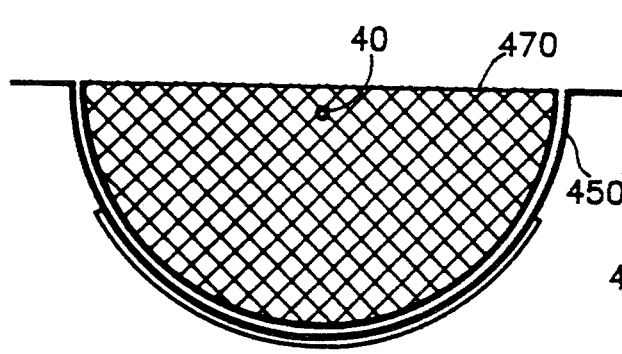 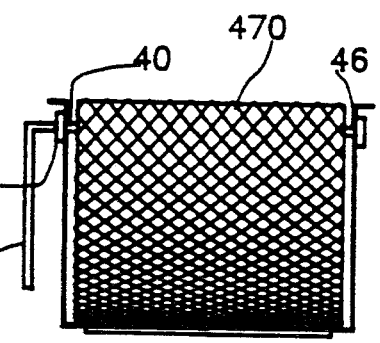
FIG.18A  FIG.18B
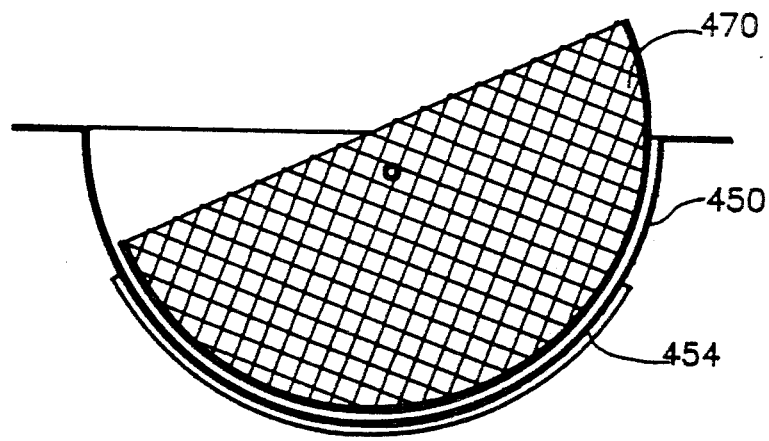
FIG.18C
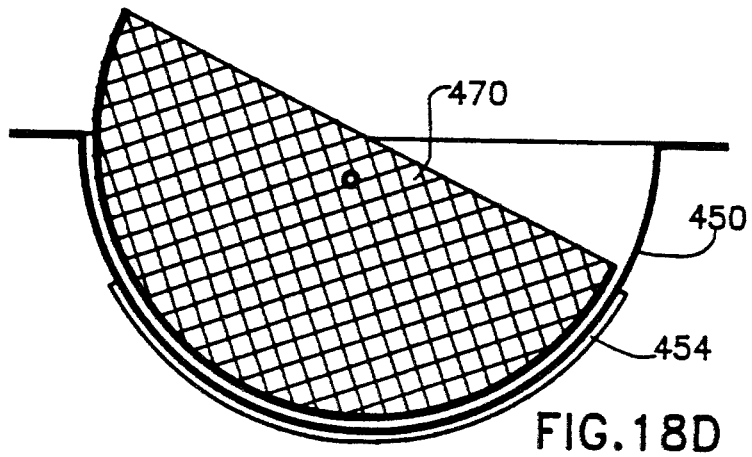
FIG.18D

HEATING SYSTEM EMPLOYING AN INDUCTION PRODUCING ELEMENT AND A HIGH PERMEABILITY FOIL

FIELD OF THE INVENTION

The present invention relates to domestic food cooking apparatus and systems generally.

BACKGROUND OF THE INVENTION

Various types of domestic food cooking apparatus are known in the art. In the domestic cooking art, there are known various automated cooking devices including mechanical mixing apparatus.

The following patents are considered to be representative of the prior art:

U.S. Pat. No. 3,635,147 describes a combination cooking-stirring vessel in which two sets of blades are rotated continuously by apparatus of a motor drive applied to the rim of a generally round bowl, as food is heated. One set of blades rotates along the bottom of the bowl except at the center bottom region.

U.S. Pat. No. 1,790,115 described apparatus for treating food products comprising a plurality of rotating blades and a curved bottom surface.

U.S. Pat. No. 4,693,610 describes an electrical household appliance for culinary purposes including apparatus for stirring and heating the contents of a bowl. This apparatus provides continuous rotation of a stirrer adjacent the bottom of a flat bottomed bowl.

U.S. Pat. No. 4,649,810 described a microcomputer-controlled, integrated cooking apparatus for automatically preparing culinary dishes. The apparatus includes a memory for storing one or more recipe programs. The recipe program specifies schedules for dispensing the ingredients from a compartmentalized carousel into a flat bottomed cooking vessel, for heating the vessel and for continuously stirring the contents of the vessel.

U.S. Pat. No. 1,491,991 describes a beverage mixer and heater which provides stirring of the contents of a container having an electric heating element incorporated in its construction.

In an industrial environment, which is distinct from the domestic food cooking field discussed above, there have been proposed various devices which provide heating or cooling of food products. For example, U.S. Pat. No. 4,073,225 describes on an industrial scale, continuously operable meatball cooker employing a trough which is engaged by helical vanes. U.S. Pat. No. 3,407,872 employs a trough-like tank having a reciprocating paddle for circulating a heating or cooling fluid.

U.S. Pat. No. 4,629,843 describes induction cooking apparatus having a ferrite coil support and includes monitoring and control apparatus for preventing heating of the ferrite coil support above its Curie temperature.

U.S. Pat. No. 4,467,162 describes an arrangement for an induction heating process employing a shielding plate member of non-magnetizable metallic material disposed in a space between a heating coil and a bottom plate.

U.S. Pat. No. 3,761,668 describes a cooking system wherein small electrical appliances are powered by an induction cooking device.

U.S. Pat. No. 4,817,510 illustrates cooking apparatus wherein the temperature of cooked food is automatically controlled and varied during a cooking cycle.

SUMMARY OF THE INVENTION

The present invention seeks to provide improved domestic food cooking apparatus as well as integrated, modular versatile domestic cooking systems for quick cooking of most foods in the kitchen. The term "cooking" will be used throughout to refer generally to the application of heat to foodstuffs in a domestic context and includes, inter alia, heating liquids of various viscosities, and dry roasting of bulk foodstuffs, such as nuts, beans and seeds.

It is a principal object of the present invention to provide a system capable of carrying out all normal domestic cooking functions within a small area. These functions include, for example, cooking of liquids, such as soups, stews and the like, frying, roasting and baking, defrosting and boiling of water.

The cooking center of the present invention may comprise a compact unit which can operate interchangeably with a wide variety of cooking utensils.

According to a preferred embodiment of the invention, the cooking center is characterized in that it provides fast and uniform cooking at high energy efficiency. The cooking center of the present invention is easy to operate and may provide controlled cooking and even stirring of foods.

There is thus provided in accordance with a preferred embodiment of the present invention a domestic cooking system including at least one cooking utensil defining a food heating surface and including heating apparatus operative to heat the food heating surface by thermal conduction, and a base defining one or more cooking locations arranged for removable engagement with at least one cooking utensil and including apparatus for providing energy to the heating apparatus including an electrical connector disposed at at least one of the cooking locations and configured for mating engagement with at least one of the utensils.

Further in accordance with a preferred embodiment of the invention, the cooking system also includes control apparatus disposed in the base for providing automatic timing and temperature control of the operation of the heating apparatus.

Still further in accordance with a preferred embodiment of the present invention, the heating apparatus comprises a foil having at least one layer of an electrical insulative material disposed in intimate touching relationship between the foil and the food heating surface, whereby heat from the heating apparatus is transferred to the food heating surface principally by thermal conduction through the electrical insulative material. The layer of electrical insulative material may be applied as a coating to the foil, or alternatively may be a separate element.

In accordance with a further preferred embodiment of the present invention, there is provided a domestic cooking system comprising a base defining at least one cooking location and comprising electromagnetic induction apparatus including an induction producing element operative to generate electromagnetic flux and at least one high permeability foil disposed so as to direct electromagnetic flux generated by the induction producing element to the cooking location.

Additionally in accordance with a preferred embodiment of the present invention, the domestic cooking system also includes at least one cooking utensil defining a food heating surface heated by the electromagnetic flux at the cooking location.

Still further in accordance with a preferred embodiment of the present invention, the utensil is formed, at least partially, of an electrically conductive material.

Further in accordance with a preferred embodiment of the present invention, the base includes at each cooking location apparatus for sensing the temperature of a cooking utensil in operative engagement therewith.

Additionally in accordance with a preferred embodiment of the present invention, the at least one foil is disposed on the opposite side of the induction producing element from the utensil.

Still further in accordance with a preferred embodiment of the present invention, the foil has a Curie temperature exceeding 250 degrees C., and preferably exceeding 320 degrees C.

Additionally, in accordance with a preferred embodiment of the present invention, each foil has a thickness of less than 0.5 mm, preferably less than 0.05 mm.

Still further in accordance with a preferred embodiment of the present invention, the foil is formed of an amorphous metal alloy.

Additionally in accordance with a preferred embodiment of the present invention, the induction producing element is non planar.

Further in accordance with a preferred embodiment of the present invention, the induction producing element comprises a plurality of induction coils.

Still further in accordance with a preferred embodiment of the present invention, the domestic food preparation apparatus includes apparatus for obtaining temperature information relating to a utensil from the electrical resistance of the heating apparatus.

Additionally in accordance with a preferred embodiment of the present invention, the utensil includes temperature monitoring apparatus.

Still further in accordance with a preferred embodiment of the present invention, the domestic food preparation apparatus also includes apparatus for controlling the supply of heat to the heating surface in accordance with the temperature of the utensil.

Additionally in accordance with a preferred embodiment of the present invention, the apparatus for controlling the supply of heat comprises apparatus for supplying heat until the temperature of the utensil exceeds the indicated desired temperature by a first threshold and thereafter supplying heat to maintain the difference between the temperature of the utensil and the indicated desired temperature within a second threshold.

Further in accordance with a preferred embodiment of the present invention, the apparatus for controlling also comprising timing apparatus.

Still further in accordance with a preferred embodiment of the present invention, the domestic food preparation apparatus also includes automatically operative stirring apparatus.

Additionally in accordance with a preferred embodiment of the present invention, the stirring apparatus comprises stirring drive apparatus and a stirrer, the stirring drive apparatus including quick coupling apparatus for automatically coupling the stirring drive apparatus to the stirrer.

Further in accordance with a preferred embodiment of the present invention, the stirring apparatus comprises reciprocal stirring apparatus.

Still further in accordance with a preferred embodiment of the present invention, the utensil comprises a curved bottom surface having a generally circular configuration.

Additionally in accordance with a preferred embodiment of the present invention, the stirring apparatus is arranged to undergo pivotal reciprocal motion about a pivot axis located generally at the center of the circle defined by the bottom heating surface for reciprocal motion along the bottom heating surface.

Further in accordance with a preferred embodiment of the present invention, the stirring apparatus includes a stirring element having at least two generally planar surfaces which lie in planes which are angled with respect to each other and with respect to the bottom heating surface.

Still further in accordance with a preferred embodiment of the present invention, the domestic food preparation apparatus also includes heat reflector apparatus operatively associated with the cooking utensil.

Additionally in accordance with a preferred embodiment of the present invention, the domestic food preparation apparatus also includes an inner food holding element associated with the utensil for supporting food.

According to a further preferred embodiment of the present invention there is provided heating apparatus comprising induction producing means operative to generate electromagnetic flux and at least one high permeability foil disposed so as to direct electromagnetic flux generated by the induction producing means to a desired heating location.

Further in accordance with a preferred embodiment of the present invention, the high permeability foil is formed of amorphous metal.

Still further in accordance with a preferred embodiment of the present invention, the induction producing means is non-planar.

BRIEF DESCRIPTION OF THE DRAWINGS

The present invention will be understood and appreciated more fully from the following detailed description, taken in conjunction with the drawings in which:

FIGS. 16, 17A, 17B, 18A, 18B, 18C, 18D and 19 are illustrations of various embodiments of the invention including an apertured inner cooking member.

DETAILED DESCRIPTION OF THE INVENTION

Figure 1A:
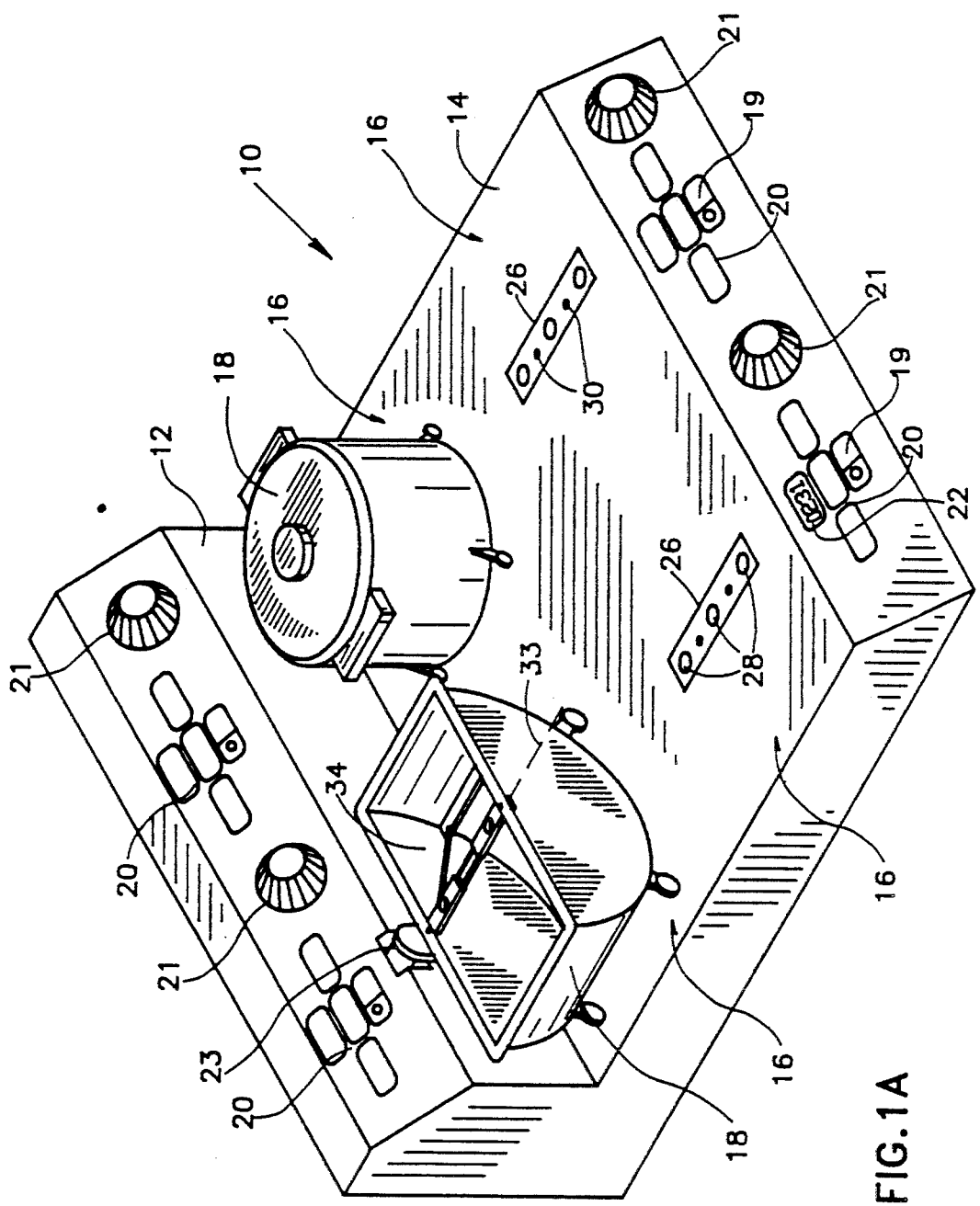
FIGS. 1A and 1B are respective pictorial and side view illustrations of a domestic cooking system constructed and operative in accordance with a preferred embodiment of the present invention.
Figure 1B:
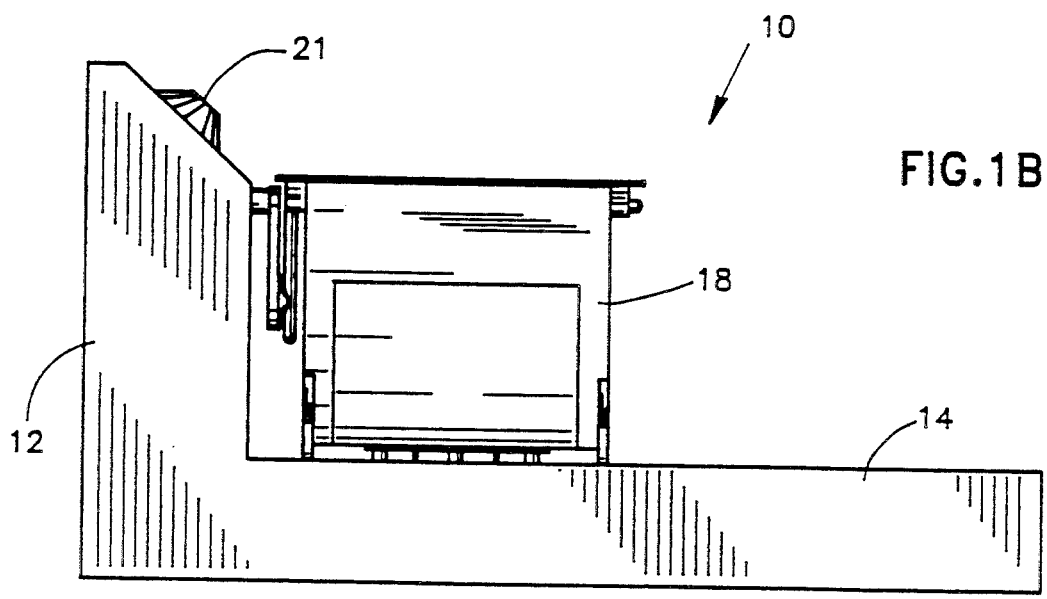

Reference is now made to FIGS. 1A and 1B which illustrate a cooking system constructed and operative in accordance with a preferred embodiment of the present invention and comprising a cooking center 10, including a back portion 12 and a base portion 14, defining a plurality of cooking locations 16, each arranged for operative association with a cooking utensil 18. Preferably, the upward facing surface of base portion 14 at each of the cooking locations 16 is a heat reflecting surface, which is operative to reflect heat towards the utensil 18. The back portion 12 and the base portion 14 comprise various controls for each of the cooking locations 16, such as on-off, temperature and timing controls which may be embodied, for example, in a switch 19 with associated indicator light, a keyboard 20 and a dial 21. A status display 22, such as an LCD display may also be provided. Also mounted on back portion 12 is a coupler 23 of a stirrer drive assembly, which is not seen in FIGS. 1A–1B, insofar as it is located at the interior of back portion 12.

The base portion 14 typically defines a plurality of cooking locations, typically four in number as illustrated. Each cooking location is typically provided with an electrical connector 26 which is arranged for operative engagement with a cooking utensil such as cooking utensils 18 illustrated in FIGS. 1A–1B.

It is a particular feature of the cooking center that each of the electrical connectors 26 includes apparatus 28 for supplying electrical power to the cooking utensil 18, typically in the form of a three conductor grounded electrical connection and also includes a data link 30 typically defining a pair of electrical connectors which may provide temperature information from a temperature sensor, integrated into the utensil 18, to utilization and control apparatus in the cooking center 10. Alternatively, the cooking center 10 may receive temperature information with respect to a given utensil 18 by other apparatus.

Control apparatus employed in the cooking center will be described hereinbelow with reference to FIG. 5.

Figure 2:
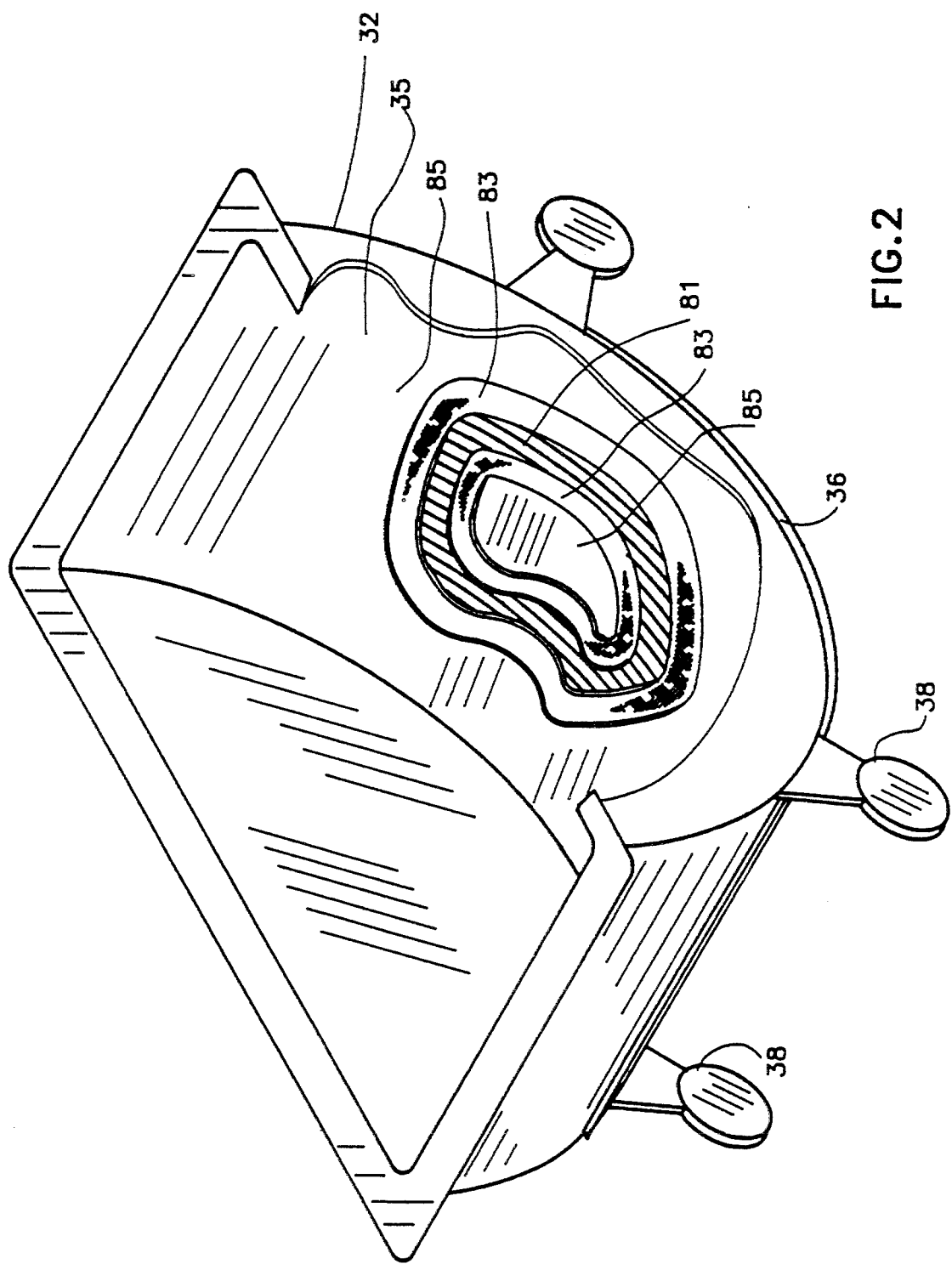
FIG. 2 is a partially cut way illustration of a cooking utensil useful in the system of FIGS. 1A and 1B.

Reference is now made additionally to FIG. 2, which illustrates a typical cooking utensil constructed and operative in accordance with a preferred embodiment of the present invention. In the illustrated embodiment, the utensil is configured to have a curved bottom surface 32 (not shown in drawing) of generally uniform width. Preferably the curvature of bottom surface 32 is generally circular and the surface is arranged to lie about an axis which is collinear with or adjacent to and slightly below the axis of rotation 33 of a stirrer 34 which may be associated with the utensil as seen in FIGS. 1A and 1B. A cover may be provided for utensil 18.

Figure 3A:
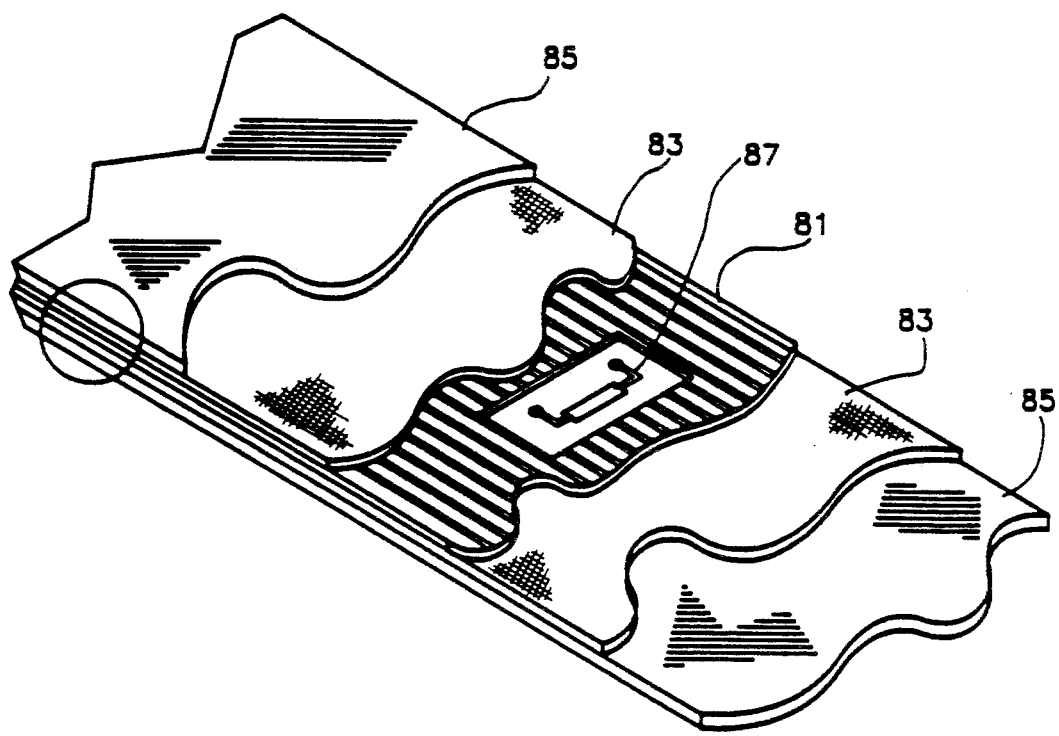
FIG. 3 is a combination peeled-away and sectional illustration of a portion of a heating element useful in a cooking utensil of the type illustrated in FIG. 2.
Figure 3B:
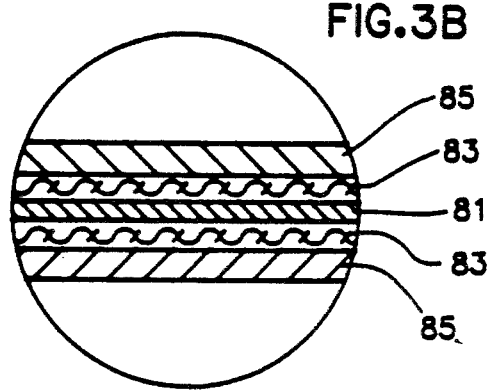

Electrical heating apparatus, preferably such as that shown in FIG. 3, preferably is located within a sealed double walled portion 36 of utensil 18 and is arranged to provide relatively quick and energy efficient, generally uniform heating of a heating surface 35 of the utensil, which is generally coextensive with the extend of the electrical heating apparatus.

Referring additionally to FIG. 3, there is illustrated a preferred embodiment of electrical heating apparatus which is particularly useful in the present invention. The heating element assembly comprises a heating element 81 preferably in the form of a relatively thin foil of a metal, of typical thickness 0.05 mm, which is configured to define an elongate electrical resistance heating element.

Preferably, element 81 has a high ration of surface coverage, typically in excess of 30% and preferably in excess of 80%, so as to provide very homogeneous heating of heating surface 35 which it heats principally by thermal conduction. Element 81 is also selectably configurable and is preferably configured so as to conform to the curvature of heating surface 35 in order to provide homogeneous efficient heating thereof.

According to a preferred embodiment of the invention, and as seen in FIG. 3, the heating element 81, described above, is located in touching engagement on both sides thereof with a layer of a dielectric material 83, such as a mica, plastic, ceramic of Fiberglas sheet. Alternatively, other suitable dielectric material may be used. For example, adhesive or non solid electrical insulation materials, such as plastic materials, may be employed. Disposed on the outside surfaces of dielectric layers 83 are metal plates 85, typically formed of stainless steel of thickness 0.6 mm. One of metal plates 85 may serve as the heating surface 35, as illustrated in FIG. 2.

It is a particular feature of the present invention that the electrical insulation layer separating the heating element 81 from the heating surface 35 is a good electrical insulator but also a good thermal conductor, which is operative to transfer heat from the heating element 81 to the heating surface 35.

In accordance with a preferred embodiment of the present invention, a temperature sensor 87, such as a thermistor, is integrally formed with the utensil 18 and is coupled to data link 30 (FIGS. 1A and 1B) in order to provide temperature information to the cooking center 10 to enable controlled cooking to take place.

According to a preferred embodiment of the invention, the utensil 18 is engaged with the base portion 14 of the cooking center 10 from above by a vertical movement. The precise positioning of utensil 18 with respect to base portion 14 at a given cooking location may be provided by any suitable apparatus, such as the interconnection between one of electrical connectors 26 (FIG. 1) and a corresponding connector 40 (FIGS. 4A-4E) typically associated with the underside of each utensil 18.

In the illustrated embodiment of FIG. 2, there are provided support legs 38 which are attached to each utensil and provide upright support thereof at the cooking location or on any other flat surface.

The stirrer 34 may be of any suitable configuration so long as it is arranged to travel generally along the curvature of the bottom surface 32 of the utensil, in spaced or touching relationship therewith.

Figure 4C:
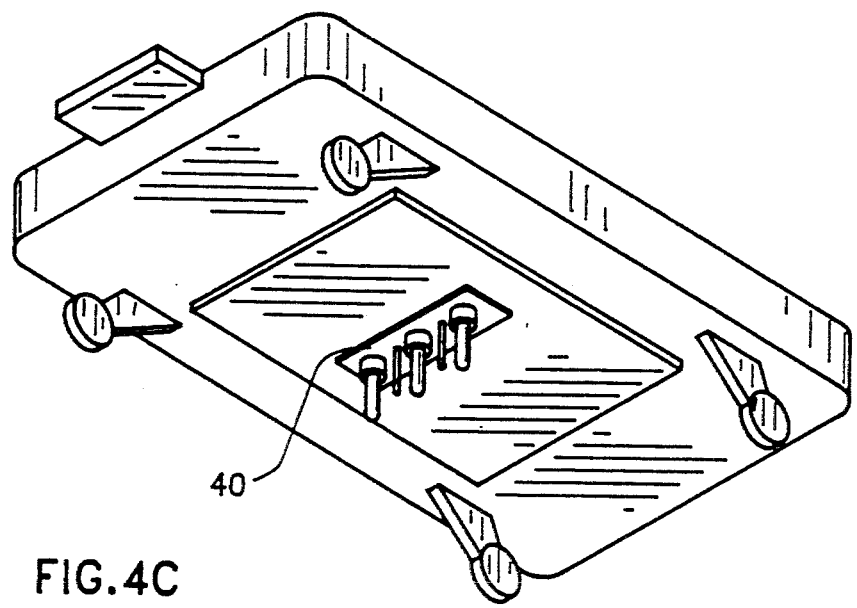
FIGS. 4A–4E are pictorial illustrations of a variety of different cooking utensils constructed and operative in accordance with a preferred embodiment of the invention.
Figure 4A:
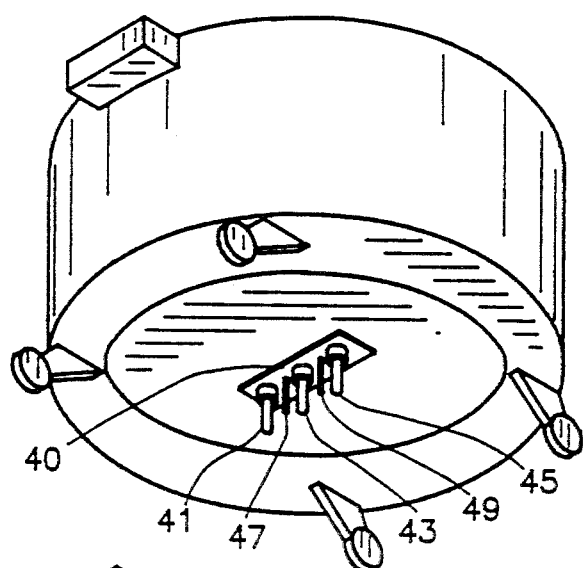
Figure 4D:
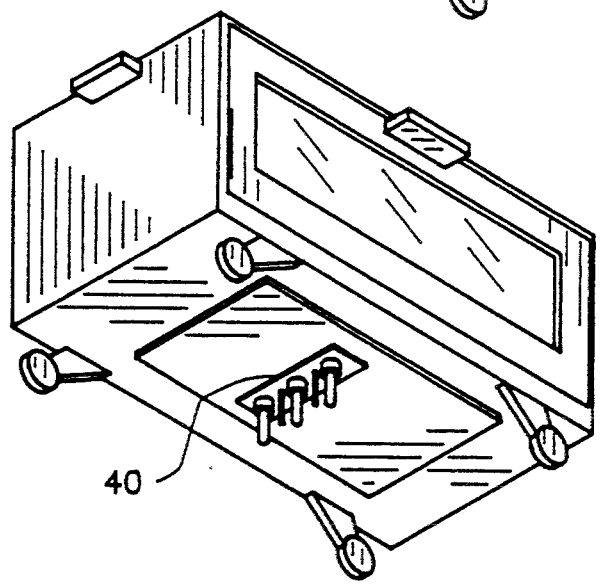
Figures 4B, 4E:
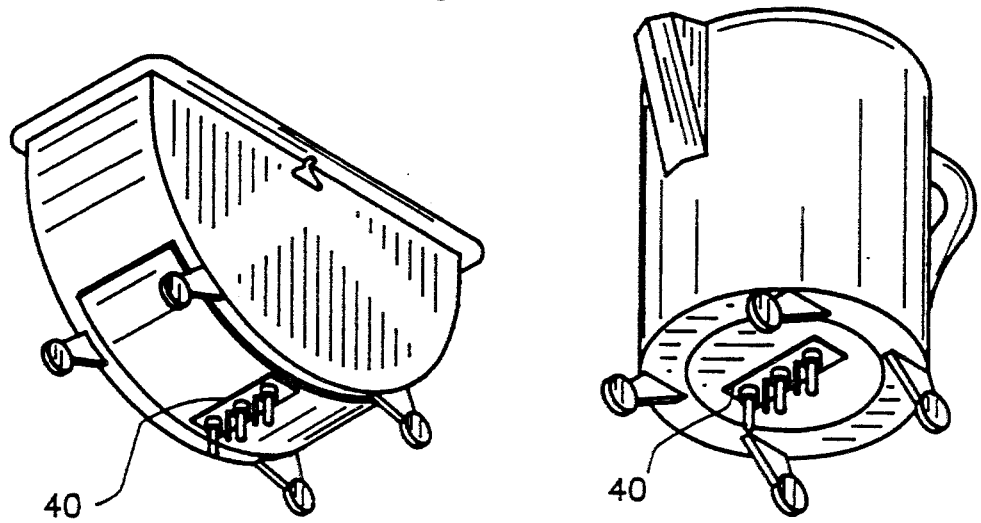

Reference is now made to FIGS. 4A-4E, which illustrate various types of utensils 18. FIG. 4A illustrates a generally cylindrical pot, while FIG. 4B illustrates a container of the general type shown in FIG. 2 which is adapted for attachment thereto of automatic stirring apparatus. FIG. 4C illustrates a shallow pan suitable for frying, while FIG. 4D illustrates an oven suitable for roasting or baking. FIG. 4E illustrates a water heater or coffee maker. Each of the above illustrated utensils is preferably formed with a connector 40 which is configured for quick connection with connector 26 for communication of power and temperature information between the cooking center or the base and the utensil. The term "utensil" is used herein in an unusually broad sense to include any domestic cooking or heating implement.

Connector 40 typically includes three pins 41, 43 and 45, which provide an electrical power connection and two additional pins 47 and 49, which provide an electrical signal connection, such as from a temperature sensor, to utilization apparatus.

Figure 5A:
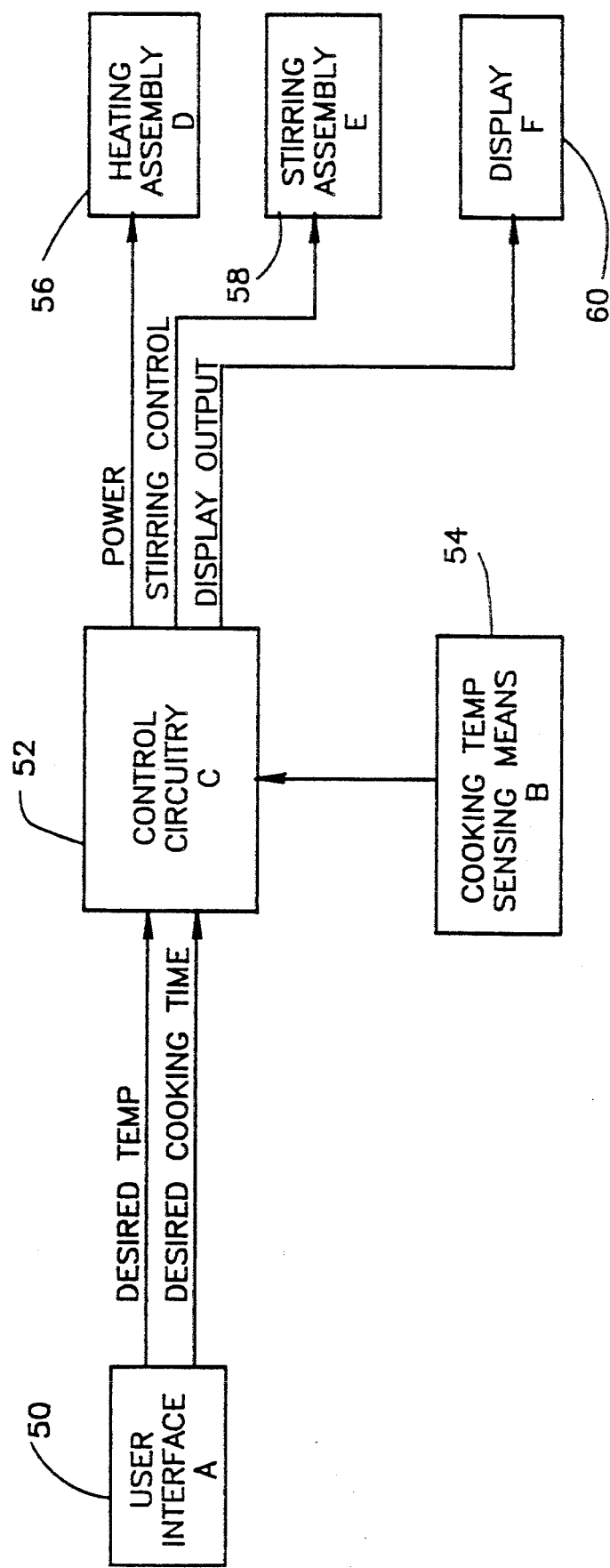
FIG. 5A is a generalized electrical diagram of control circuitry useful in the present invention.

Reference is now made to FIG. 5A which illustrates cooking control apparatus particularly useful in the present invention and including user interface apparatus 50, typically incorporating switch 19, keyboard 20 and dial 21 (FIG. 1A), which provide control inputs relating to desired cooking time and desired temperature to control circuitry 52. Control circuitry 52 also receives a temperature input from temperature sensing apparatus 54 and provides a power output to a heating assembly 56, such as heating element 81, a stirring control output to a stirring assembly 58, such as stirring assembly 91, described hereinbelow, and a display output to a display 60, such as display 22. Detailed schematic illustrations of control circuitry particularly suitable for various embodiments of the invention are described hereinbelow, it being noted, that the user interface 50 and cooking temperature sensors 54 and heating assemblies 56 for only one cooking location are shown in each schematic.

According to an embodiment of the invention, where inductive heating is employed, heating assembly 56 may be suitably modified.

Figure 5B:
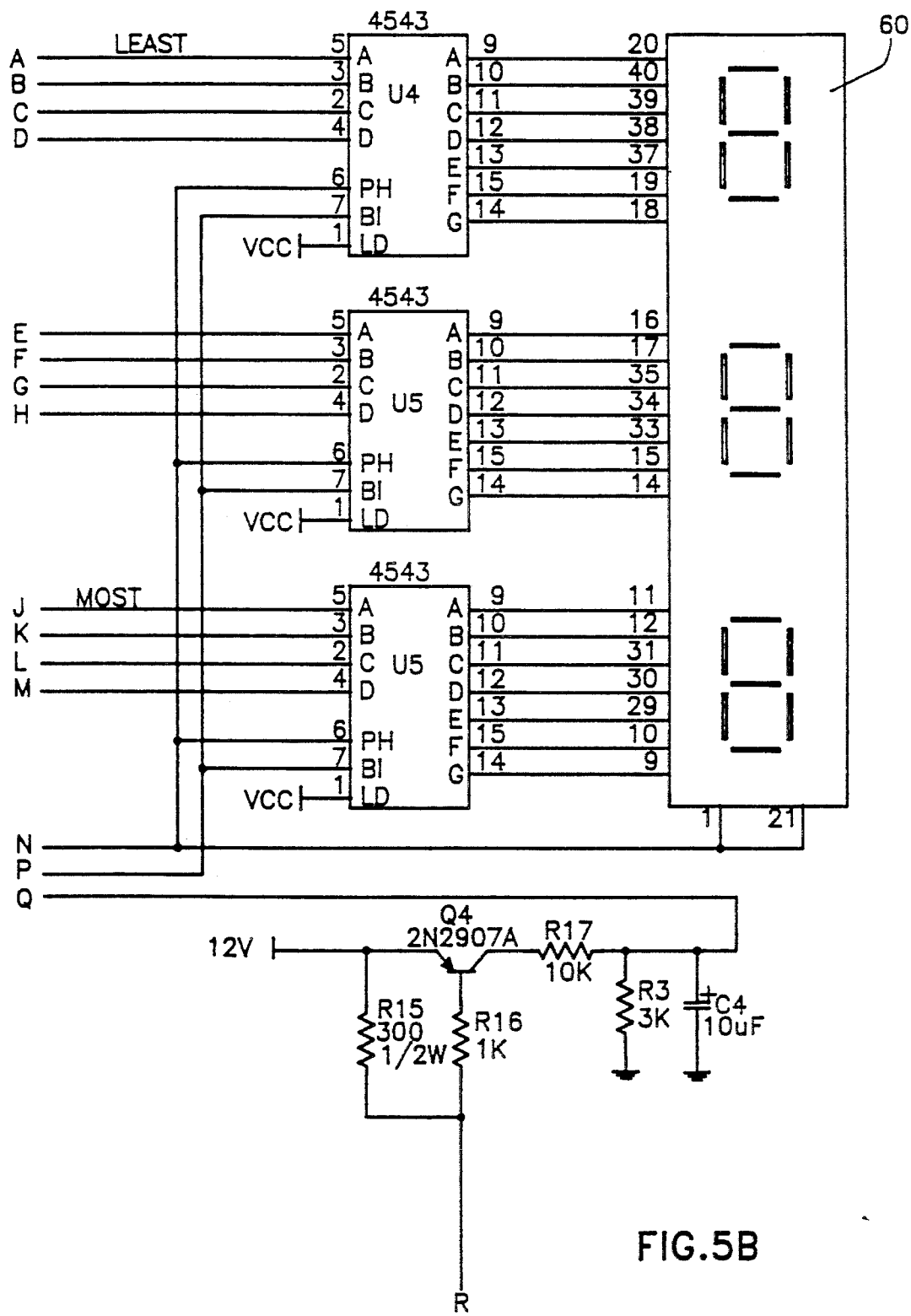
FIGS. 5B, 5C, and 5D are electrical schematic illustrations of portions of the control circuitry of FIG. 5A, which are common to plural embodiments thereof.
Figure 5C:
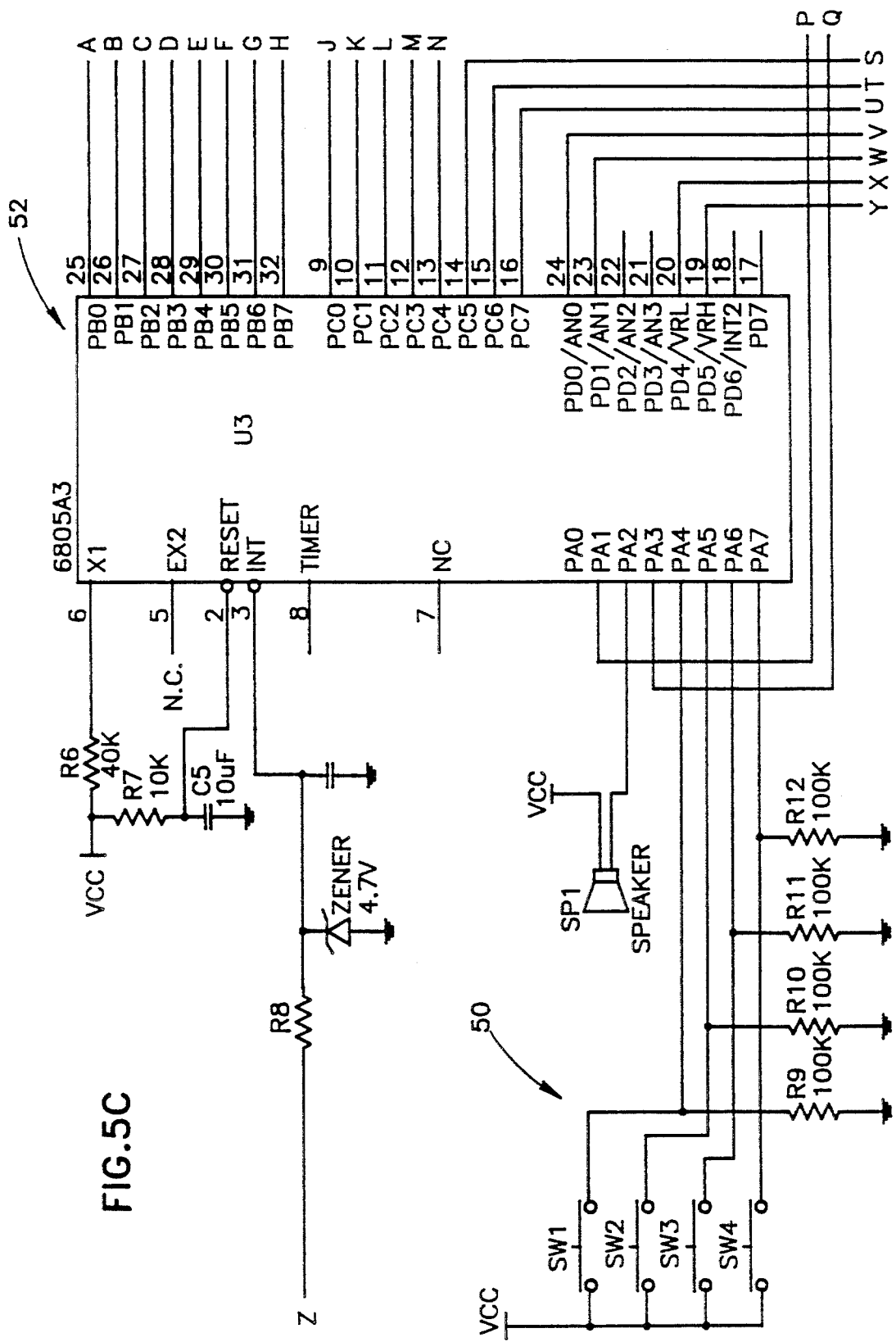
Figure 5D:
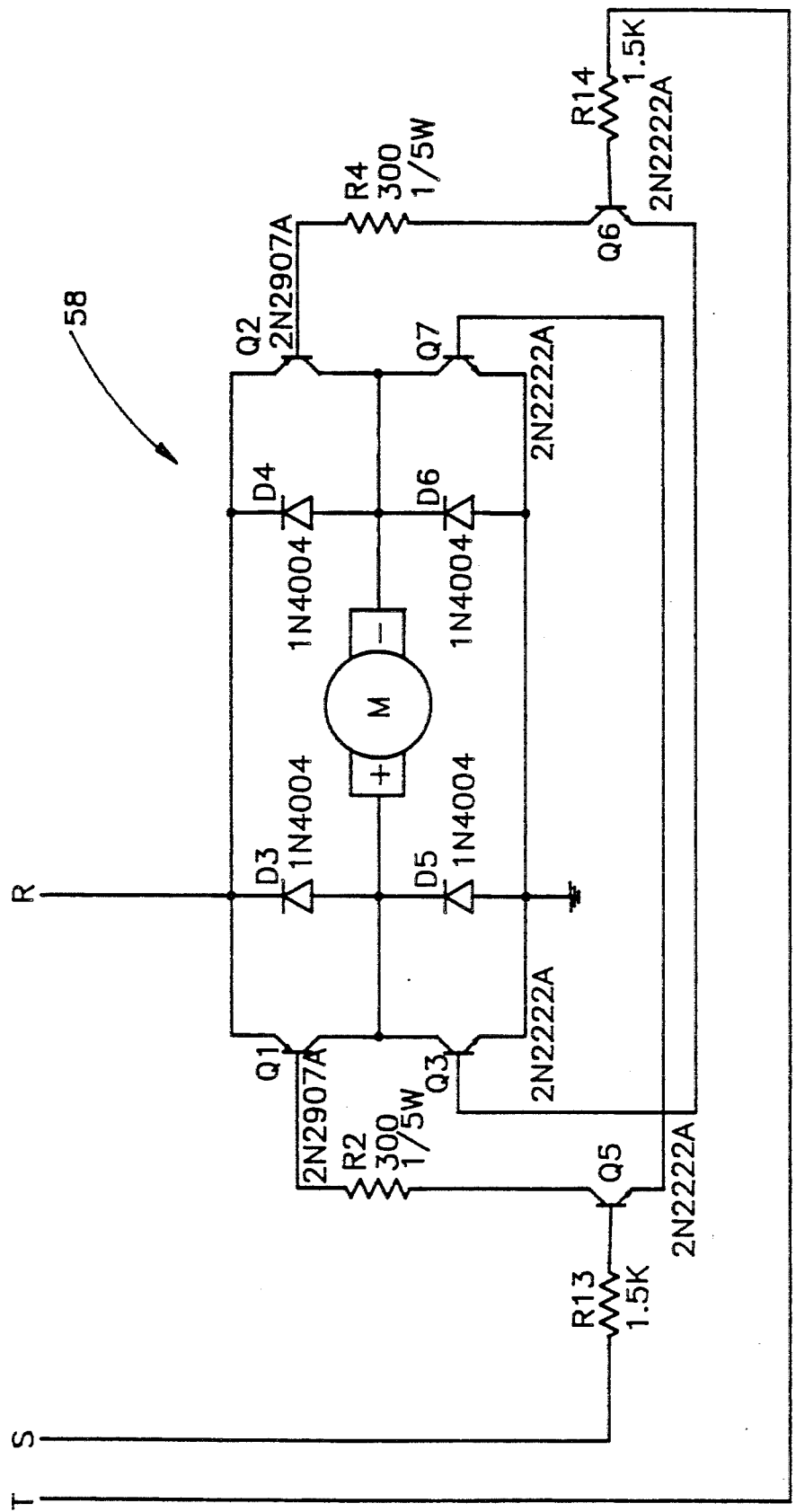

Reference is now made to FIGS. 5B, 5C and 5D which are electrical schematic illustrations of a portion of the control circuitry of FIG. 5A which is common to three different embodiments which will now be described.

Figure 5E:
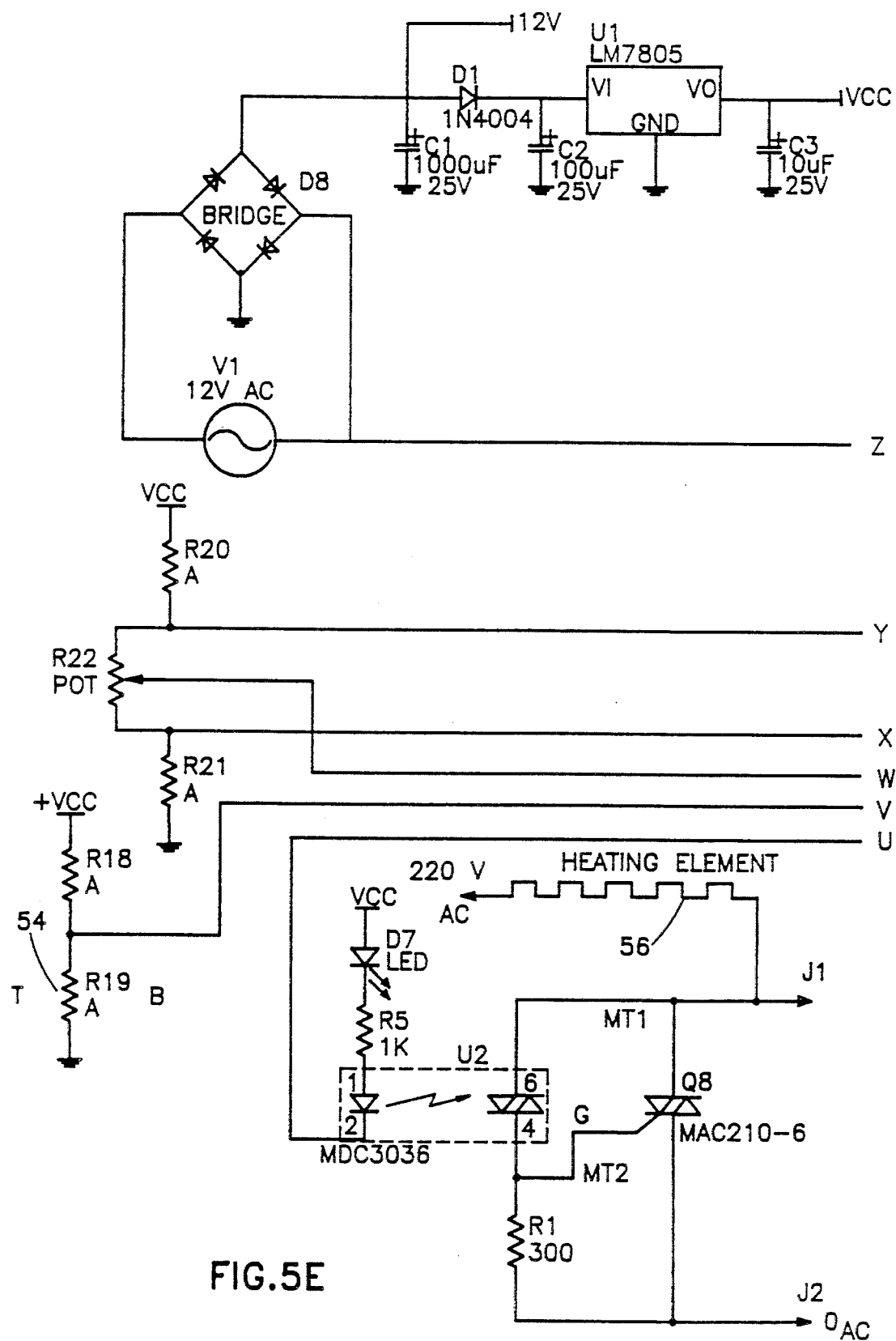
FIG. 5E is an electrical schematic illustration of a portion of the control circuitry of FIG. 5A which is specific to one embodiment thereof.

Reference is now made to FIG. 5E, which is an electrical schematic illustration of control circuitry, which, when combined with the circuitry of FIGS. 5B, 5C and 5D is particularly suitable for use with the apparatus of FIGS. 1A and 1B, wherein a temperature sensor, such as a thermistor is employed. The thermistor or other temperature sensor is preferably integrally formed in the utensil, as illustrated in FIG. 3, but may alternatively be external thereof.

Figure 5F:
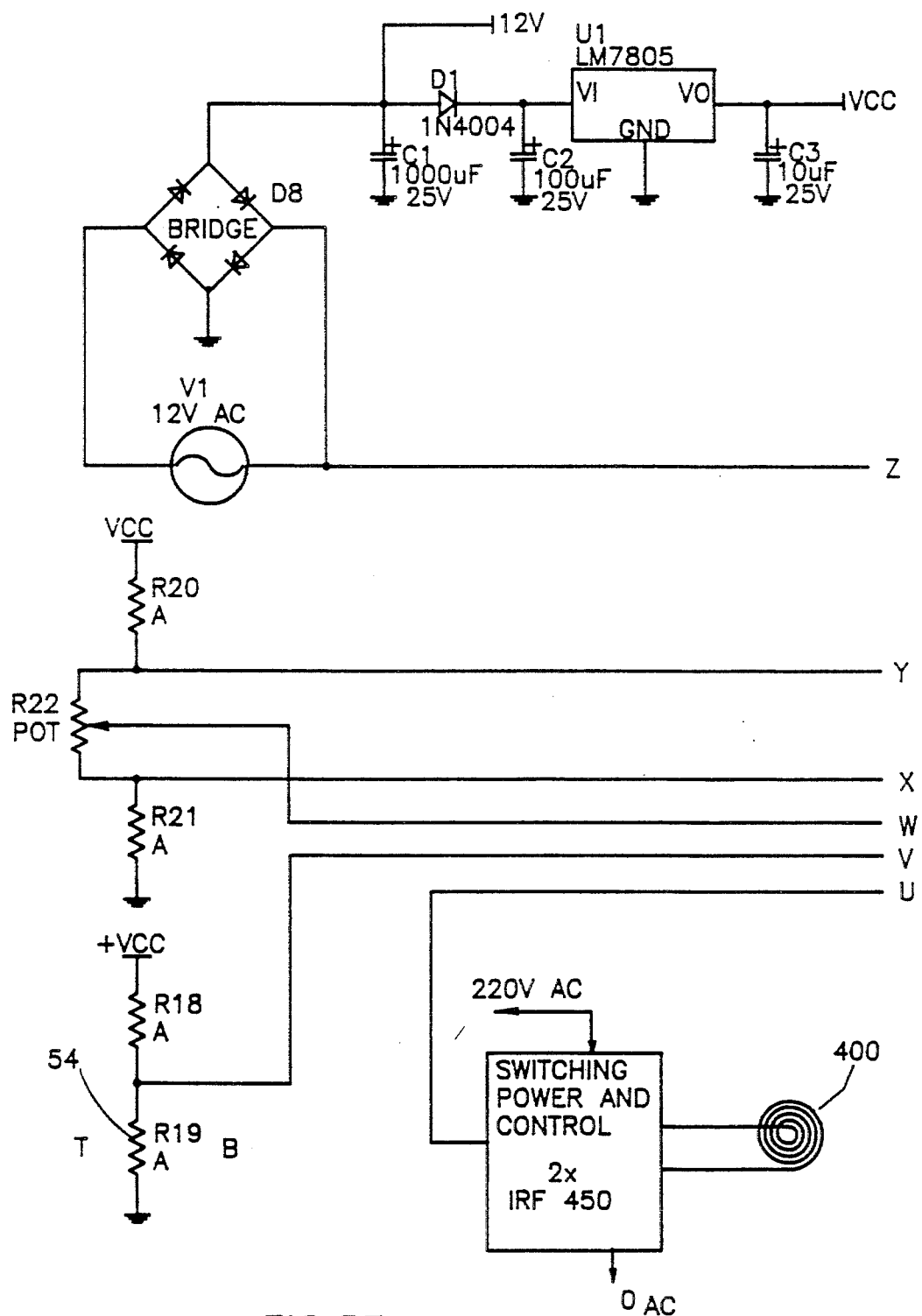
FIG. 5F is an electrical schematic illustration of a portion of the control circuitry of FIG. 5A which is specific to another embodiment thereof.

Reference is now made to FIG. 5F, which is an electrical schematic illustration of control circuitry, which, when combined with the circuitry of FIGS. 5B, 5C and 5D is particularly suitable for use with the apparatus of FIGS. 14 and 15A-15C. Here, the illustrated heating element is an induction generator 400 of the type illustrated, for example in FIG. 15A. Preferably, the induction generator 400 is powered by switching power and control circuitry which provides a train of AC pulses having a frequency of about 20,000 Hz.

Figure 5G:
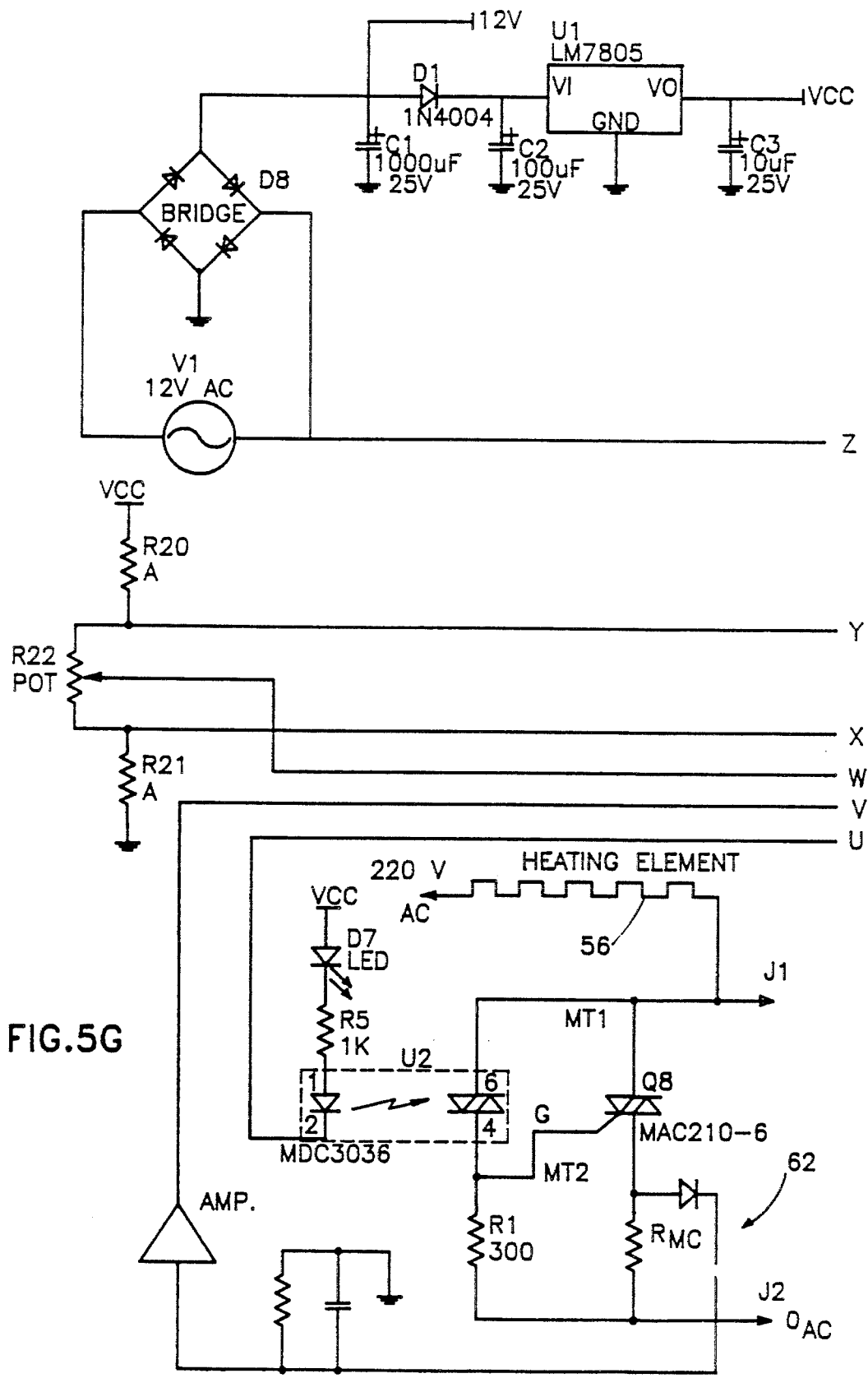
FIG. 5G is an electrical schematic illustration of a portion of the control circuitry of FIG. 5A which is specific to yet another embodiment thereof.

Reference is now made to FIG. 5G, which is an electrical schematic illustration of control circuitry which, when combined with the circuitry of FIGS. 5B, 5C and 5D, is particularly suitable for an embodiment of the invention wherein the temperature of the utensil is determined without the use of a dedicated temperature sensor, but instead by sensing the resistance of the heating element. Circuitry for this purpose is illustrated at reference number 62.

Figure 6:
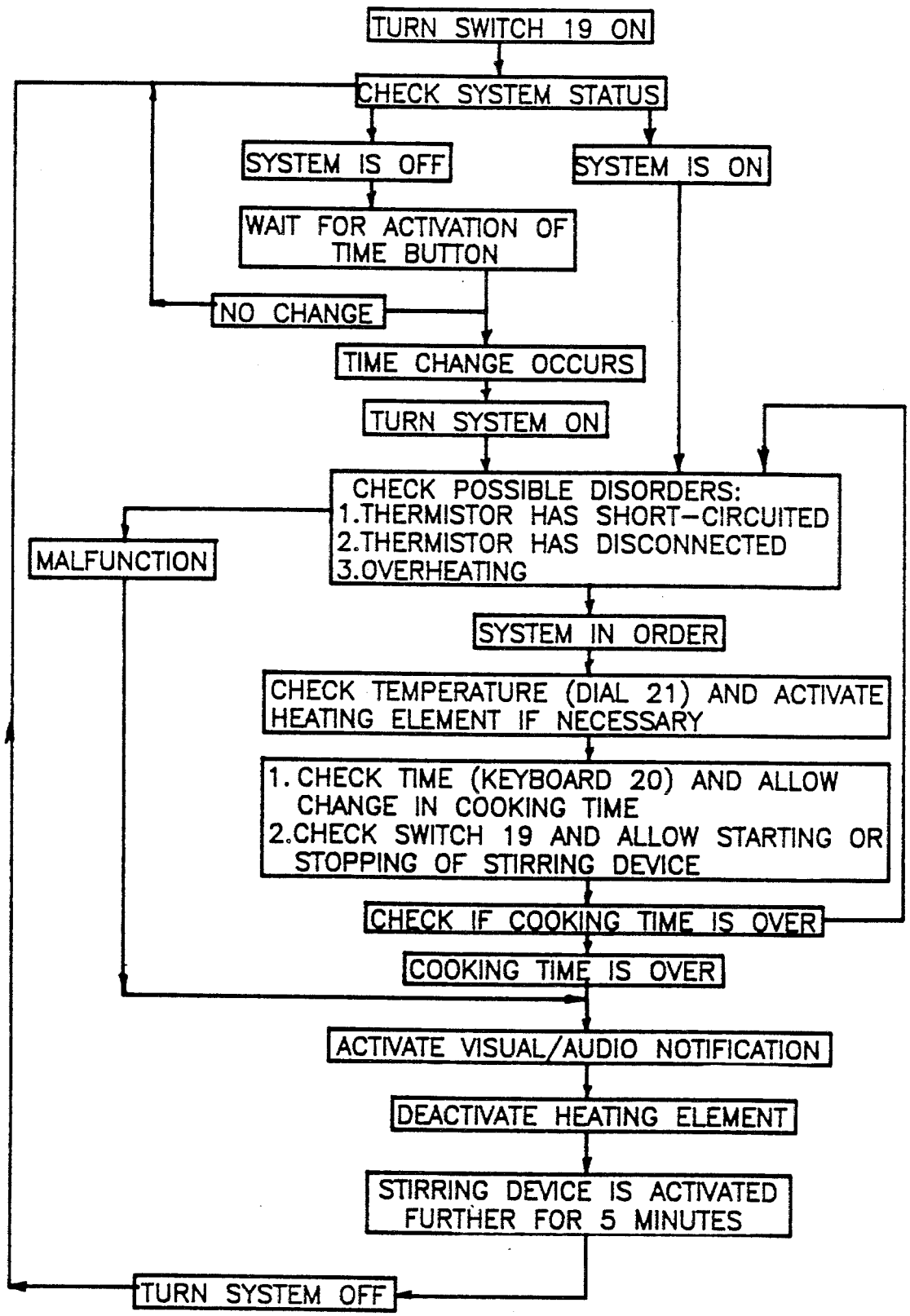
FIG. 6 is a flow chart illustrating the operation of the control circuitry of FIG. 5.

Reference is now made to FIG. 6, which is a generalized flow chart illustrating the operation of the circuitry of FIGS. 5A-5G. As can be seen from the flow chart, upon turning on the system for a cooking location by operating switch 19, following system initialization and fault checks, the system checks the desired temperature indicated by dial 21 and compares it with the temperature indicated by the temperature sensing apparatus. The heating element is operated as appropriate.

The following subroutine may be employed at this stage:

1. operate the heating element for 40 seconds;
2. discontinue operation of the heating element for 20 seconds and measure the temperature at the utensil cooking surface;
3. if the measured temperature at the utensil cooking surface exceeds a predetermined temperature, such as 100 degrees Centigrade, shift to pulsed operation of the heating element (such as operation for 20 seconds followed by a 20 seconds interval) until the measured temperature reaches the desired cooking temperature indicated by dial 21;
4. once the measured temperature is equal to or above the desired cooking temperature indicated by dial 21, apply further heat in relatively short pulses, (such as 10 second pulses) only when the measured temperature falls below the desired cooking temperature;
5. if the measured temperature is less than the predetermined temperature, instead of step 3, operate the heating element continuously until a weighted temperature is reached, the weighted temperature being greater than the desired cooking, typically by a factor of about 1.4 times the difference between the measured temperature and the desired cooking temperature. Once the measured temperature reaches the weighted temperature, operate according to step 4.

Additionally the system operates to monitor the remaining desired cooking time and the ON status of switch 19. It provides for operation of the stirring device throughout cooking or as desired by the user. Upon termination of the desired cooking time, the heating element is turned off and the stirring is typically continued for a given period and then terminated. Visual and/or auditory notification of completed cooking may be provided to the user.

Reference is now made to FIGS. 7-9B, which illustrates a stirring assembly 91 which is arranged for operative engagement with a cooking utensil 18. The stirring assembly 91 preferably comprises a stirring member 93, typically having a configuration as illustrated which defines a pair of stirring surfaces 95, each of which are oriented at an angle alpha greater than 90 degrees with respect to the facing food heating surface 97 of the utensil 18.

The stirring member 93 is arranged to ride along the food heating surface 97 and is spring mounted on a pair of shafts 99, associated with springs 100, arranged for spring loaded movement parallel to the axes thereof as indicated by arrows 101 to permit the stirring member 93 to follow a food heating surface which may not be at a fixed distance from the axis of rotation of the stirring member 93.

Shafts 99 are mounted on a transverse mounting assembly 103, which includes two engagement members 105, each of which is formed at its outermost axial facing end 106 with a protrusion 108, which is arranged to removably seat in a corresponding recess 109 formed in a side wall 110 of utensil 18.

Figure 9B:
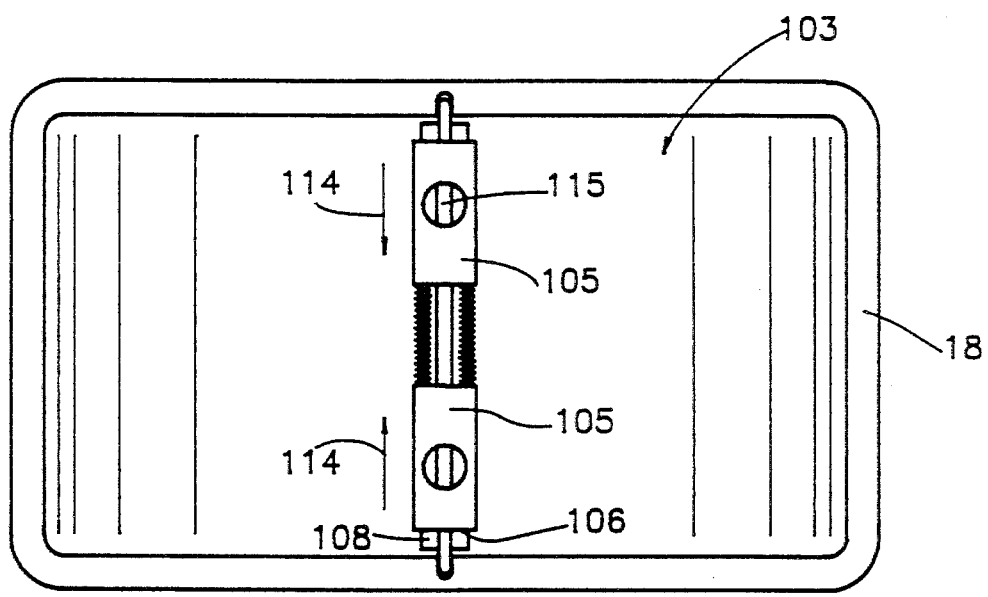
FIGS. 9A and 9B are top view illustrations of the stirring assembly of FIG. 7 in respective seated and non-seated orientations.
Figure 9A:
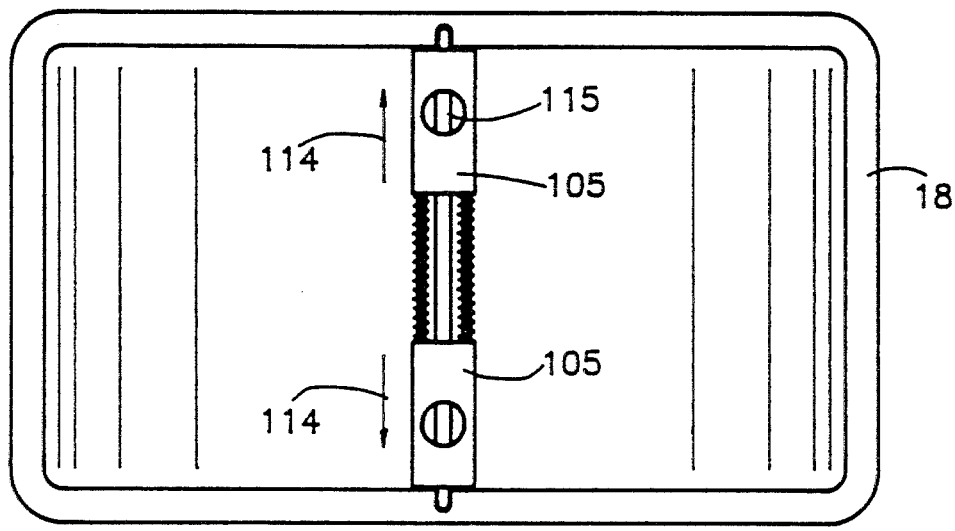

Engagement members 105 are resiliently mounted on a pair of shafts 112 associated with respective springs 113, to permit the engagement members 105 to be moved axially towards each other for engagement with and disengagement from the utensil 18, as illustrated in FIG. 9B and to return to an axially more separated orientation, as illustrated in FIG. 9A, for seating in respective recesses 109. The permitted movements of engagement members 105 are illustrated by arrows 114.

Figure 7:
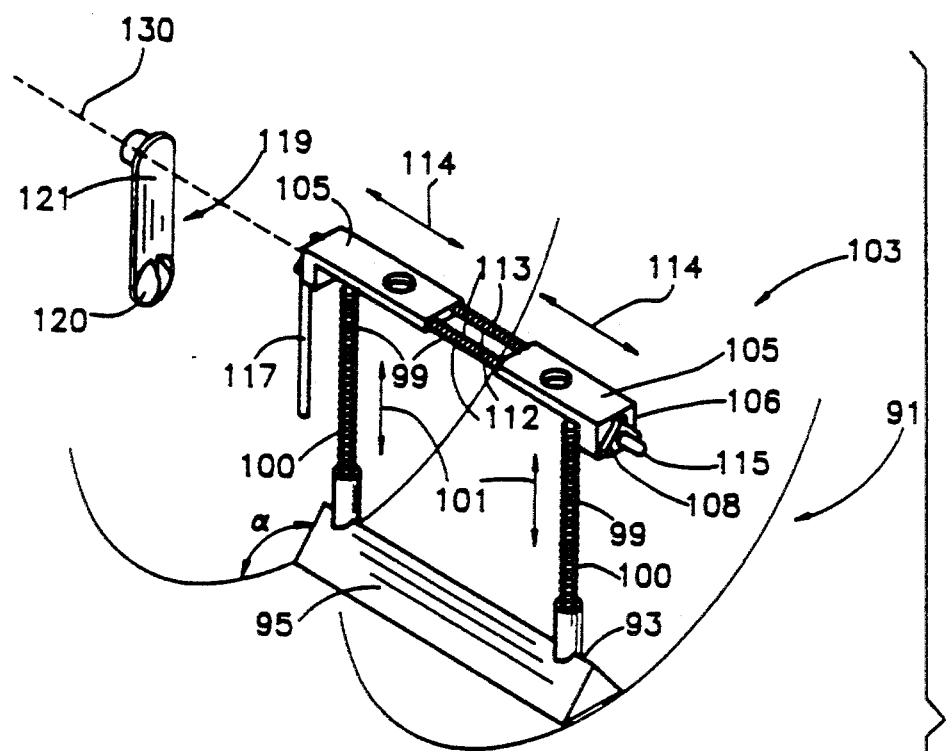
FIG. 7 is an exploded view illustration of a stirring assembly associated with a cooking utensil in accordance with a preferred embodiment of the present invention.
Figure 7:
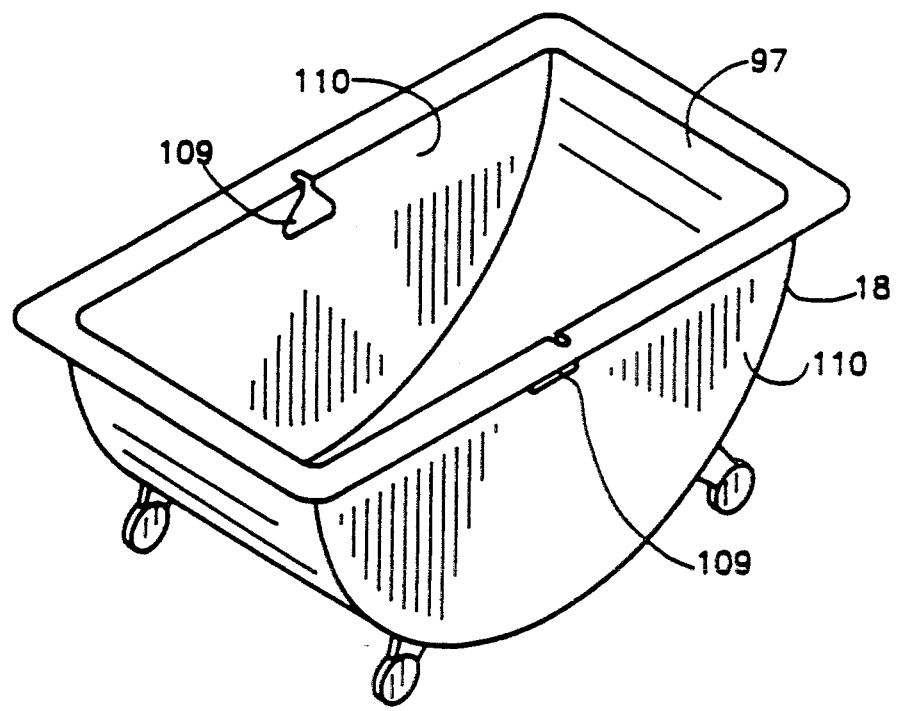
Figure 8:
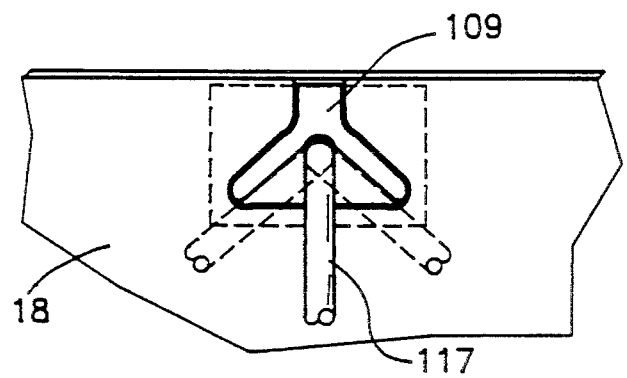
FIG. 8 is a detailed illustration of part of the stirring assembly of FIG. 7 in a plurality of alternative orientations.

Rotatably mounted on transverse mounting assembly 103 is a rotation axle 115 onto which are mounted shafts 99. Fixedly mounted onto rotation axle 115 are formed as an extension thereof is a driving lower 117, which is arranged for driven engagement with a coupler 119, having a coupler engagement portion 120, mounted on a resilient mounting arm 121 (FIG. 7).

Figure 10A:
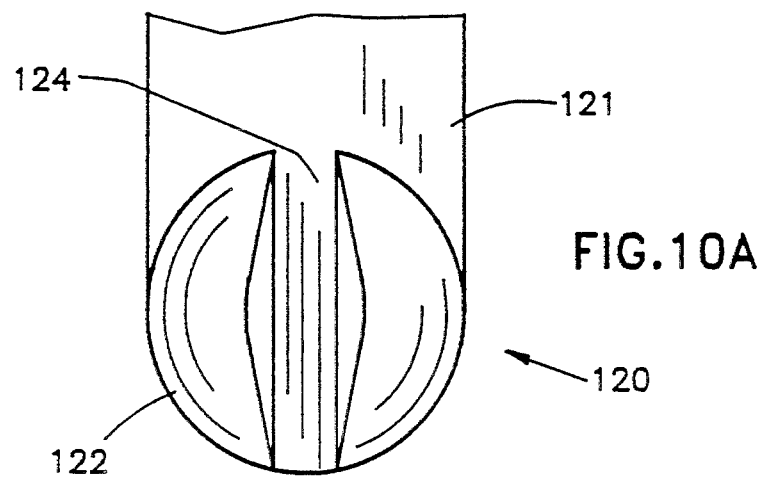
FIGS. 10A and 10B are plan view and edge view illustrations of a stirring coupler constructed and operative in accordance with a preferred embodiment of the present invention.
Figure 10B:
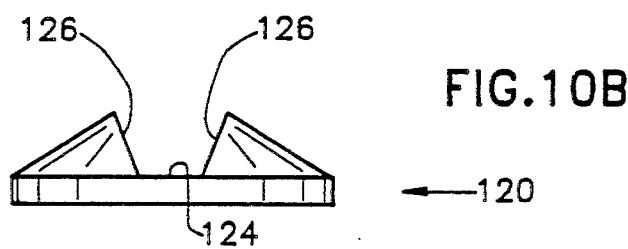

Reference is now made to FIGS. 10A and 10B which illustrate a preferred embodiment of coupler engagement portion 120. The engagement portion generally comprises a bifurcated cone 122 whose center is slotted by a slot 124 having inclined side walls 126.

Figures 11A, 11B, 11C:
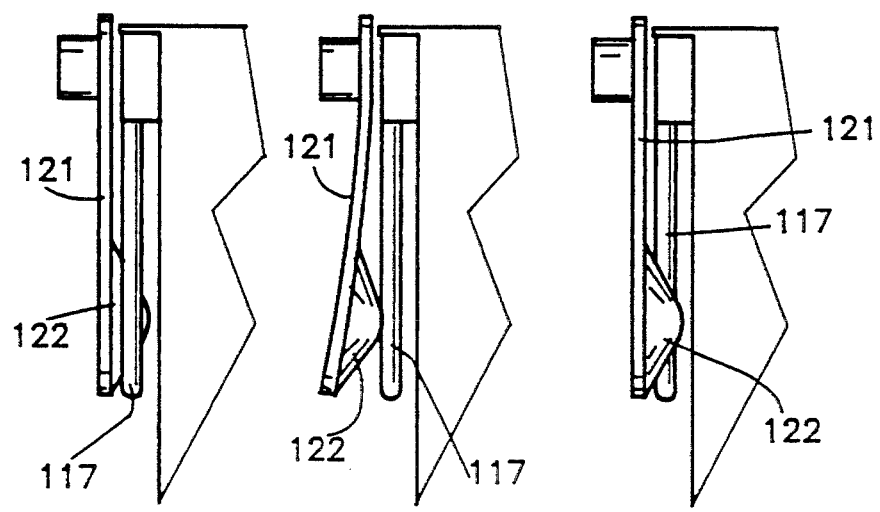
FIGS. 11A, 11B and 11C are three illustrations illustrating steps in engagement of part of the stirring assembly of FIG. 7 with the coupler of FIGS. 10A and 10B.

Reference is now made to FIGS. 11A, 11B and 11C which illustrate steps in the engagement of stirring driving lever 117 with engagement portion 120. In FIG. 11A, the driving lever 117 is shown alongside the engagement portion 120. In FIG. 11B, the driving lever 117 is shown at the top of engagement portion 120, adjacent slot 124, as mounting arm 121 is bent correspondingly. FIG. 11C illustrates seating of the driving lever 117 in slot 124, such that rotation of the coupler 119 about its rotation axis 130, produces rotation of the stirring assembly, and specifically axle 115 about rotation axis 130.

Figure 12A:
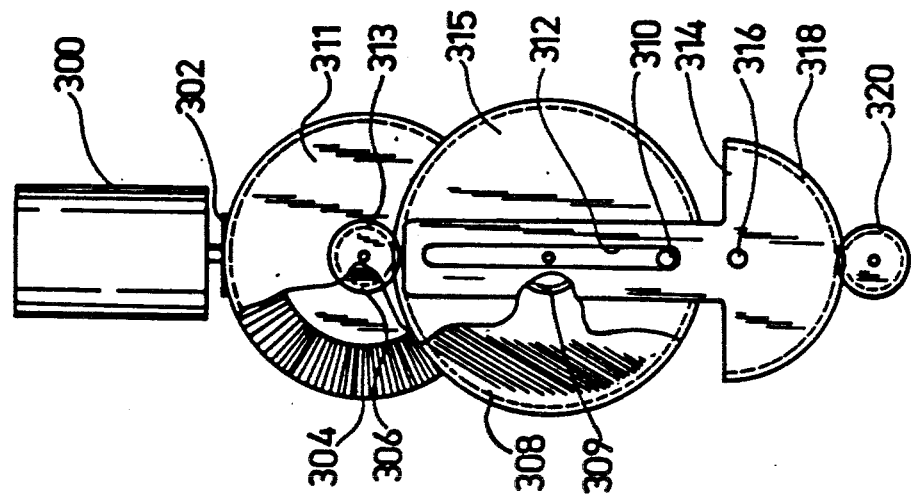
FIGS. 12A and 12B are respective plan and side view illustrations of stirring drive apparatus useful in associated with the apparatus of FIGS. 9A–11C.
Figure 12B:
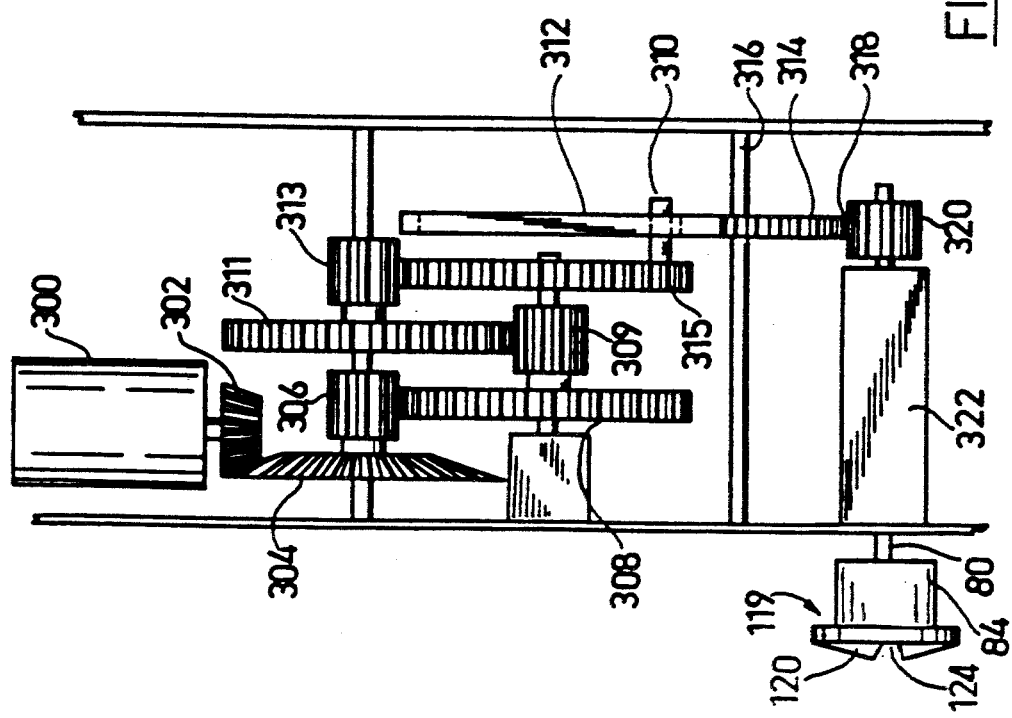

Reference is now made to FIGS. 12A and 12B which illustrate apparatus for driving the stirring coupler 119 in reciprocal rotational motion. The drive apparatus of FIGS. 12A and 12B comprises a motor 300 coupled to a conical gear 302, which drives a conical reducing gear 304 to which is fixed an intermediate gear 306, which drives a further reducing gear 308. Reducing gear 308 is fixed to an intermediate gear 309, which drives an additional reducing gear 311. Gear 311 is fixed to an intermediate gear 313 which drives a further reducing gear 315.

Formed on gear 315 is a pin 310 which engages a cam slot 312 in a cam 314 which is arranged to pivot about an axis 316 and is formed with a toothed gear surface 318. Surface 318, which is rotated about axis 316 in reciprocal motion by the engagement of pin 310 in slot 312, drives a gear 320 which drives coupler 119 via a bearing assembly 322, a drive shaft 80 and a mounting element 84.

Figure 13A:
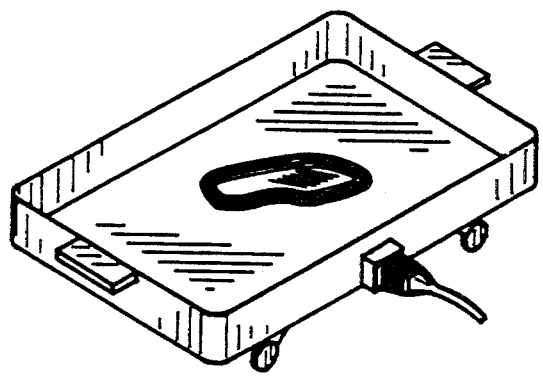
FIGS. 13A–13D are pictorial illustrations of various stand-alone cooking utensils constructed and operative in accordance with a preferred embodiment of the invention.
Figure 13B:
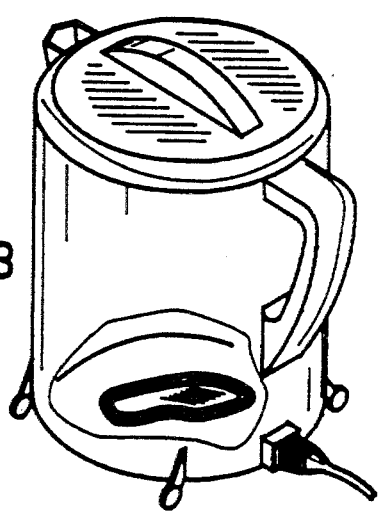
Figure 13C:
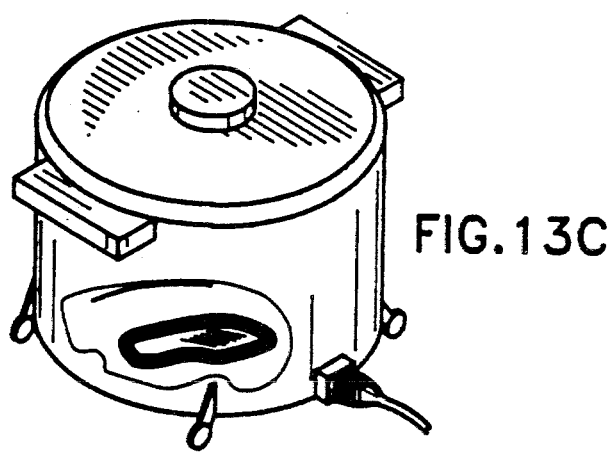
Figure 13D:
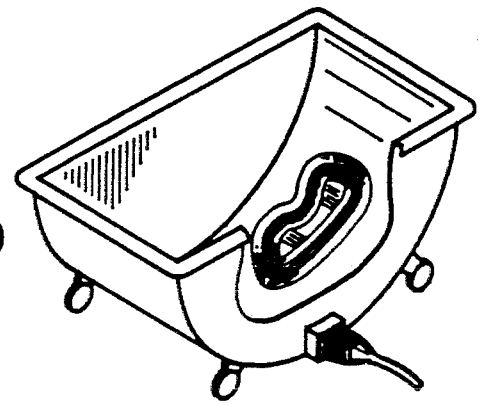

Reference is now made to FIGS. 13A-13D, which illustrate stand alone cooking utensils constructed and operative in accordance with a preferred embodiment of the invention. FIG. 13A illustrates a shallow pan; FIG. 13B illustrates a kettle; FIG. 13C illustrates a flat bottomed cooking pot and FIG. 13D illustrates a cooking utensil of the general type illustrated in FIG. 2.

Each of the embodiments of FIGS. 13A-13D is characterized in that it comprises an integrally formed heating assembly which heats a cooking surface principally by thermal conduction, thus providing fast and energy efficient heating. As seen in each of FIGS. 13A-13D, the heating assembly in each of the embodiments preferably comprises a heating element of the general type illustrated in FIG. 3 and described hereinabove in connection therewith.

Figure 14:
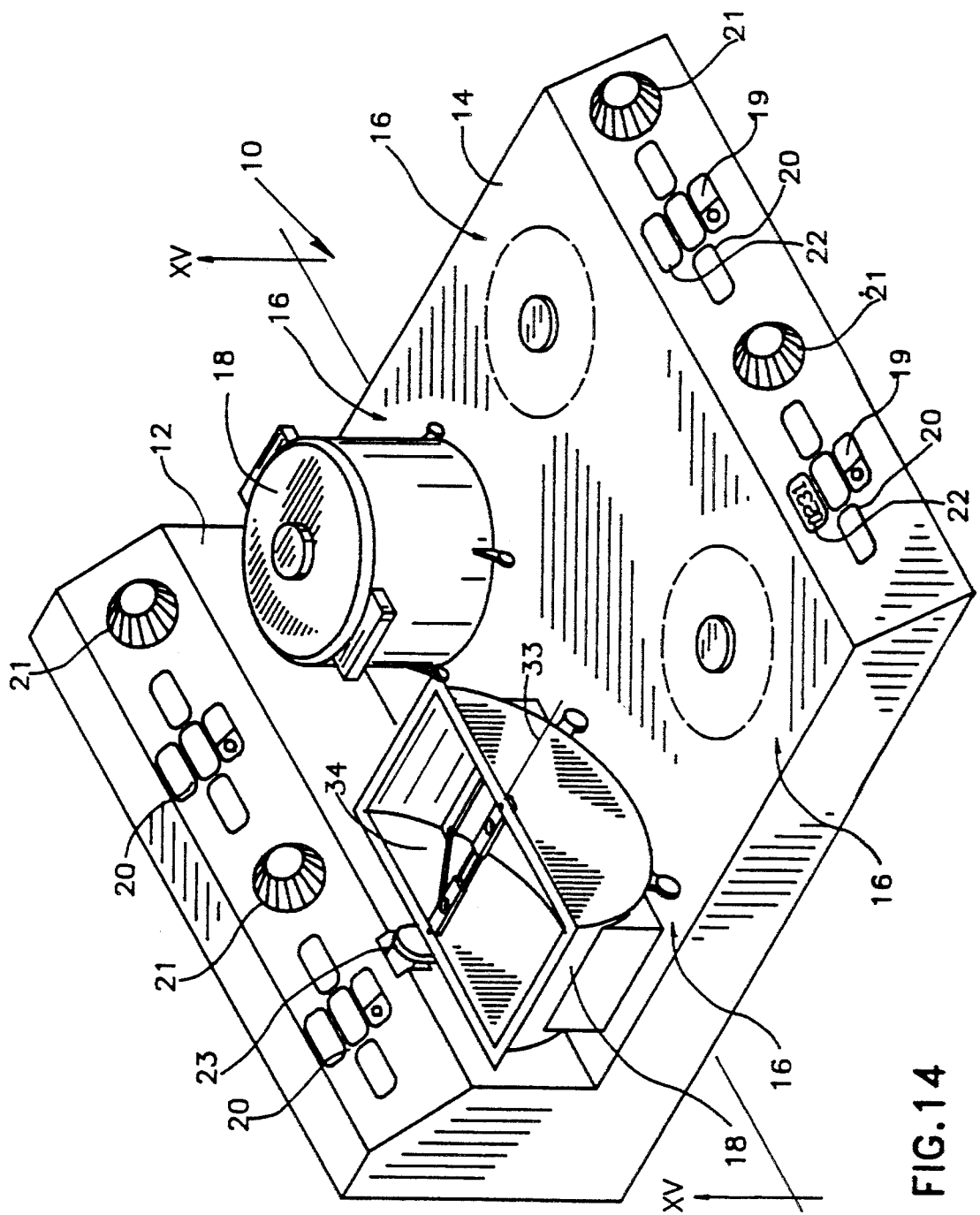
FIG. 14 is a pictorial illustration of a domestic cooking system constructed and operative in accordance with another preferred embodiment of the present invention.

Reference is now made to FIG. 14, which illustrates a domestic cooking system constructed and operative in accordance with a preferred embodiment of the present invention. The system of FIG. 14 may be generally the same as that shown in FIGS. 1A and 1B and described hereinabove in connection therewith with the exception that induction heating apparatus is provided at one or more of the cooking locations.

In the embodiment of FIG. 14, for the sake of illustration, all of the cooking locations are provided with induction heating apparatus. A typical induction heating unit is described, for example at page 184 of TDK Product Selection Guide 87/88 catalog no.: AVE002G and in U.S. Pat. Nos. 4,629,843 and 4,467,162, the description of which is hereby incorporated by reference.

Figure 15A:
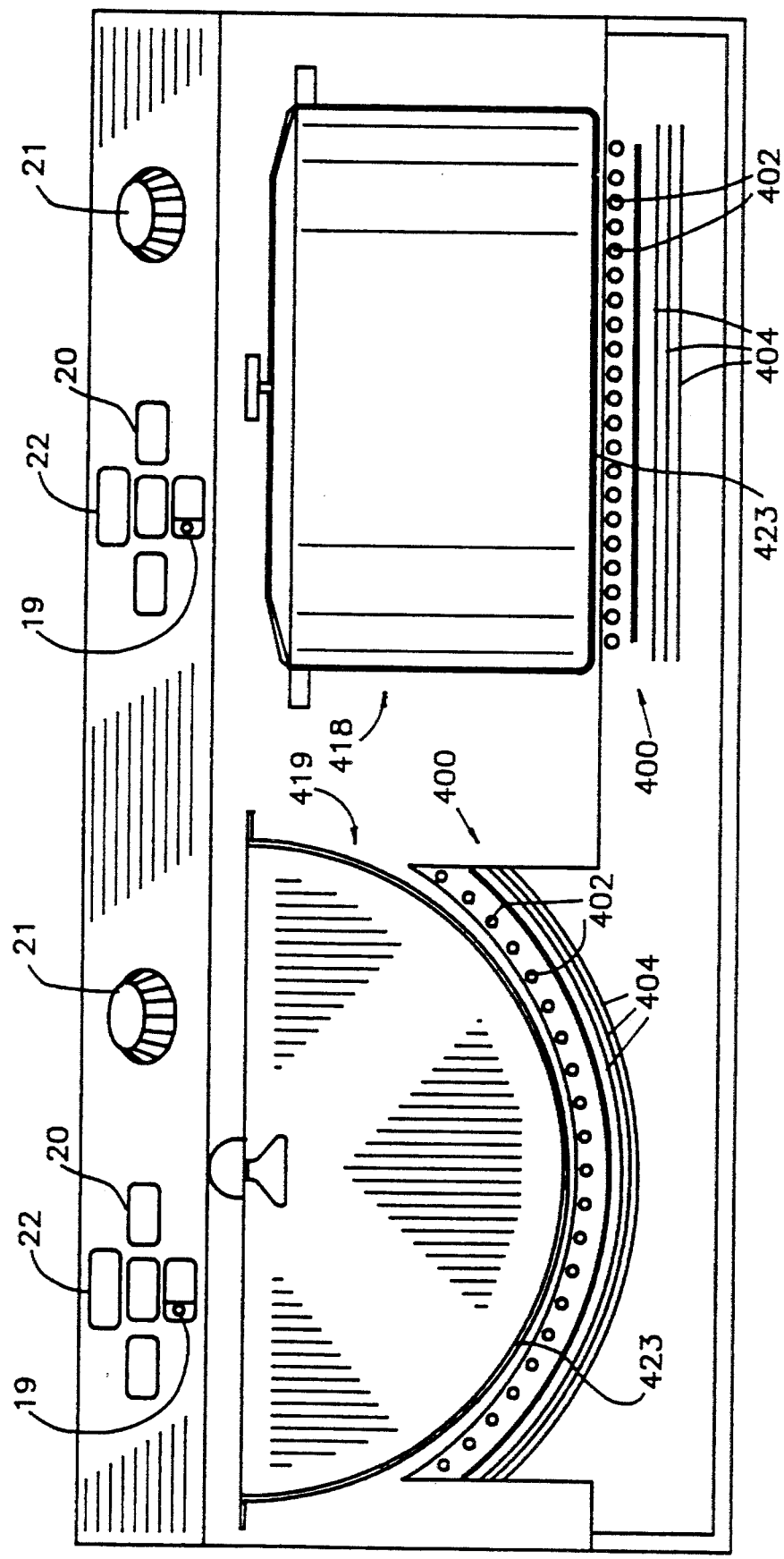
FIGS. 15A, 15B and 15C are side view illustrations showing three alternative arrangements of utensils and electrically conductive material useful with the cooking center of FIG. 14.
Figure 15B:
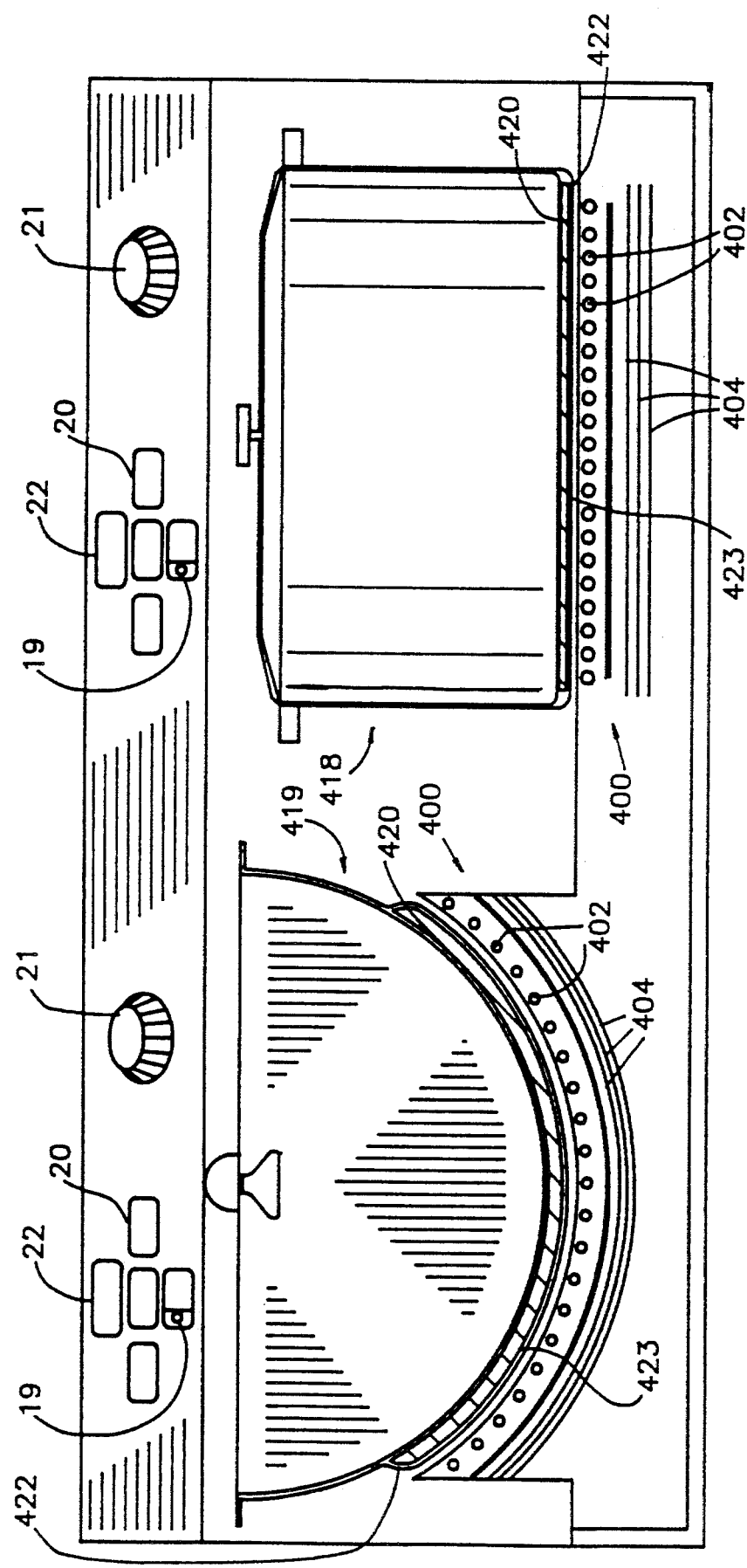
Figure 15C:
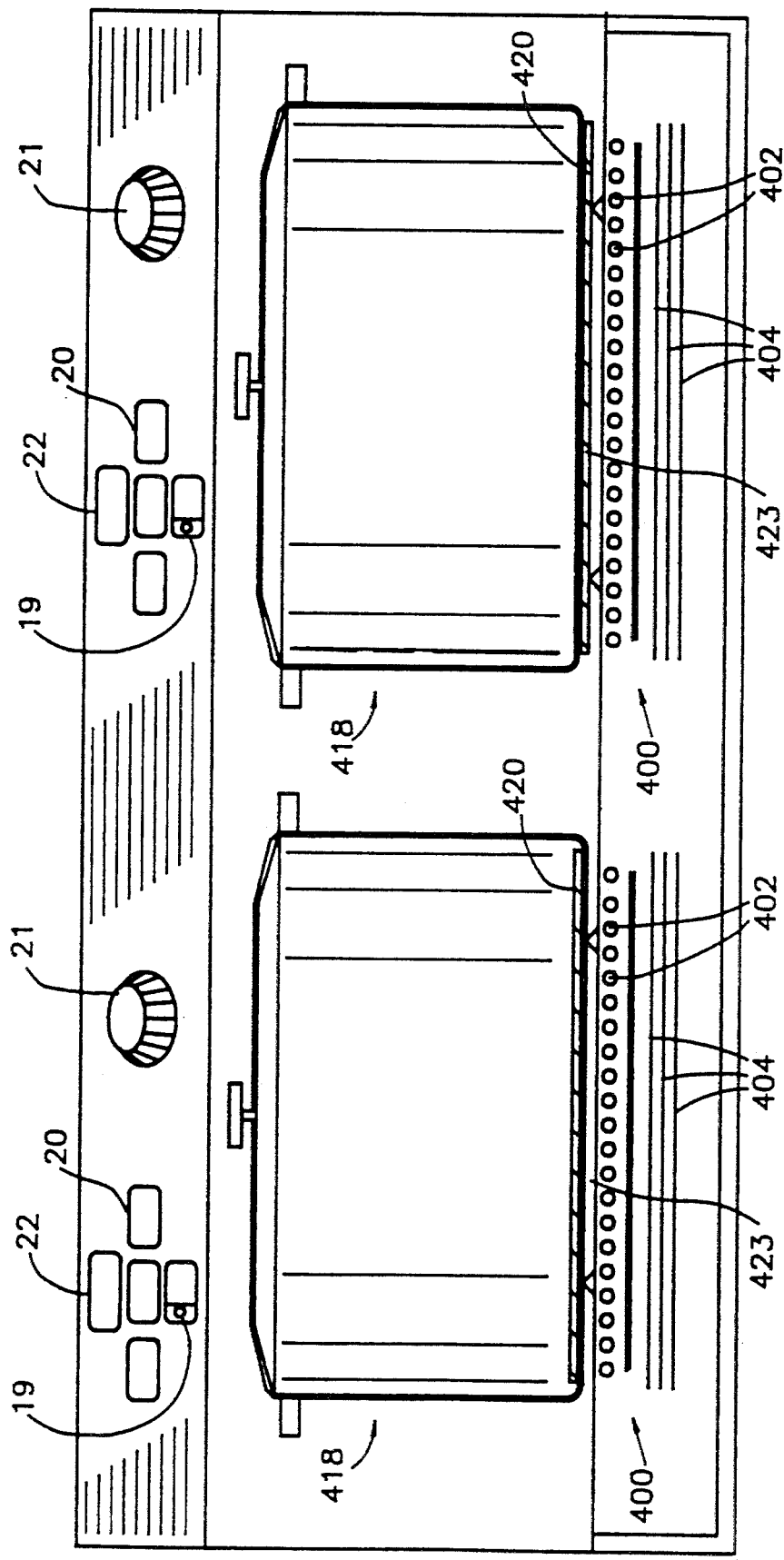

Reference is now made to FIGS. 15A, 15B and 15C, which illustrates three alternative embodiments of the invention employed induction heating. In FIG. 15A, which represents a section taken along the lines XV—XV in FIG. 14, cooking utensils formed of electrically conductive material, such as iron, stainless steel or aluminum may be employed.

The induction heating apparatus comprises an induction generator assembly 400 including an induction generator 402, comprising an electrical conductor which carries a current flow and is typically, but not necessarily, in the form of one or more coils. Associated with induction generator 402 in electrically insulated relationship therewith, is ferromagnetic material, preferably in the form of a plurality of mutually electrically insulated foils 404 of a high permeability material, preferably an amorphous metal, typically each of thickness 0.025 mm. Some preferred materials are UL- TRAPERM 10, PERMENORM (5000 H2 and 5000Z) and VITROVAC 4040, all of which are commercially available from VACUUMSCHMELZE of Human, West Germany. Electrical insulation is preferably provided between induction generator 402 and any surface normally engageable by a user.

It is a particular feature of the invention that a cooking utensil 418 may be provided of any suitable electrically conductive material which is inductively heated by induction generator 402.

It is a further particular feature of the present invention that the inductively heated cooking utensil need not necessarily have a flat bottom surface or flat food cooking surface and that the induction generator 402 need not be planar.

As seen in FIG. 15A, cooking utensils, such as a utensil 419, having a curved bottom surface 423 may be heated by induction. In this embodiment, the induction generator 402 and preferably the entire induction generator assembly 400, is preferably curved to conform to the curvature of the bottom surface 423.

It is a particular feature of the invention that the magnetic flux produced by induction generator 402 in response to passage of suitable current therethrough is spatially defined by the utensil 419 and by foils 404. The use of mutually electrically insulated thin foils 404 instead of a continuous body of ferromagnetic material lowers the heating of the generator assembly 400 as compared with the heating which would occur in a continuous body of ferromagnetic material, such as ferrite.

It is a particular feature of the present invention that foils 404 are formed of a material, such as amorphous metal, which has a relatively high Curie temperature and high permeability, especially at the operating frequency of induction generator assembly 400, typically 20,000 Hz.

Ferrite slabs, employed in the prior art, have a Curie temperature of about 180 degrees C., which requires that care be taken that the induction generator 402 and/or the cooking utensil does not heat the ferrite to above the Curie temperature. Accordingly, in the prior art a relatively thick conductor needs to be used in the induction generator 402 and complicated and expensive protective devices are required in order to ensure that the Ferrite is not overheated.

It is a further particular feature of the present invention that foils 404 display high permeability, at the working induction and frequency, preferably in the range of 15000 as compared with a permeability of about 1000 characterized of Ferrite. This production extremely efficient induction heating an less radiation leakage than in the prior art.

Reference is now made to FIG. 15B, which also represents a sectional illustration taken along the lines XV—XV of FIG. 14 and is similar to the embodiment of FIG. 15A, but illustrates an alternative embodiment of the invention. Here the cooking utensil 418 may be provided of any suitable material and includes a heating element 420 fixedly associated therewith which in inductively heated by induction generator 402. In the illustrated embodiment, the heating element 420 comprises a member formed of electrically conductive material, such as stainless steel, having a typical thickness of 0.5 mm. The heating element 420 is typically disposed at the bottom of the cooking utensil and may be fixedly attached thereto as by welding or the use of an adhesive, or alternatively integrally formed therewith.

Typically the utensil 418 includes a covering portion 422 over the heating element 420. The covering portion 422 may be made of any suitable material, such as plastic. If the heating element 420 is formed of stainless steel, than the covering portion 422 may be eliminated.

Reference is now made to FIG. 15C which shows two alternative arrangements of heating elements 420 and utensils 418. In both arrangements shown in FIG. 15C, the heating element 420 is preferably a body of electrically conductive material which is not attached to the utensil 418. In the arrangement on the left side of the drawing, the heating element is simply placed inside a non-conductive cooking utensil, while in the arrangement on the right side of the drawing, the heating element is placed on the base at a cooking location and any suitable non-conductive cooking utensil is placed thereover. In the arrangement of FIG. 15C, ordinary cooking utensils may be employed in the cooking system of the present invention without requiring any modification, provided that suitable heating elements are associated therewith, for example as illustrated.

Figure 16:
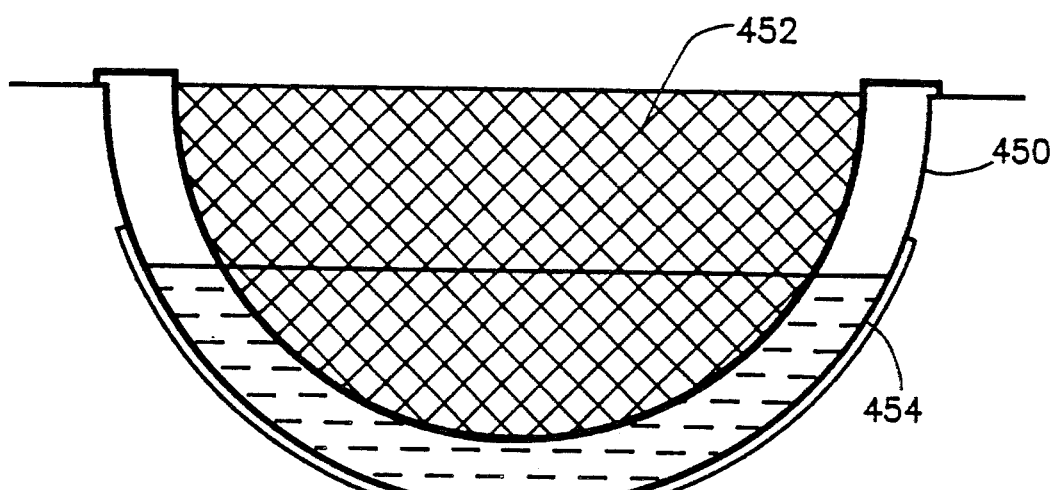

Reference is now made to FIG. 16 which illustrates a utensil 450 having associated therewith an apertured inner member 452 adapted for holding food products during deep frying. Inner member 452 typically comprises a grid or screen of the type conventionally used in deep frying applications. Preferably a heating element 454 is fixedly associated with the container 450. Alternatively the utensil 450 may be heated by induction and the heating element 454 may be eliminated.

Figure 17A:
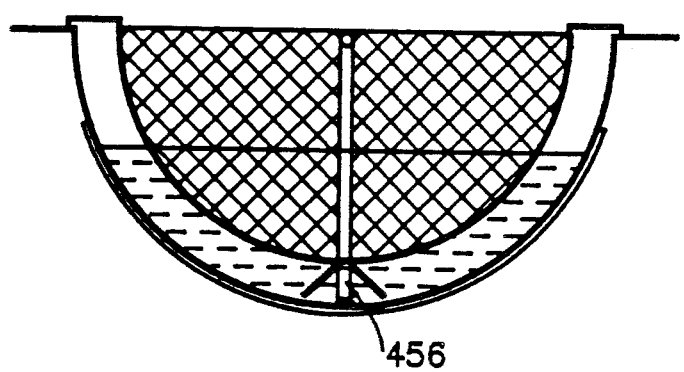
Figure 17B:
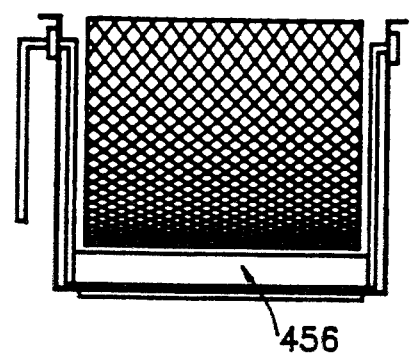

FIGS. 17A and 17B illustrate an arrangement of the type shown in FIG. 16 with the addition of a stirrer assembly 456. The stirrer assembly typically comprises an assembly of the type illustrated in FIGS. 7-12B.

Reference is now made to FIGS. 18A-18D, which illustrate a synergistic integration of the embodiment of FIGS. 17A and 17B, wherein an apertured inner member 470 also itself defines a stirrer and is provided with a stirrer mounting and drive arrangement such as that shown in FIGS. 7-12B, typically including assembly 103, 115 and 117. FIGS. 18C and 18D illustrate two typical extreme rotated orientations of the apertured inner member 470 with respect to container 450, which if fixedly associated with heating element 454.

Figure 19:
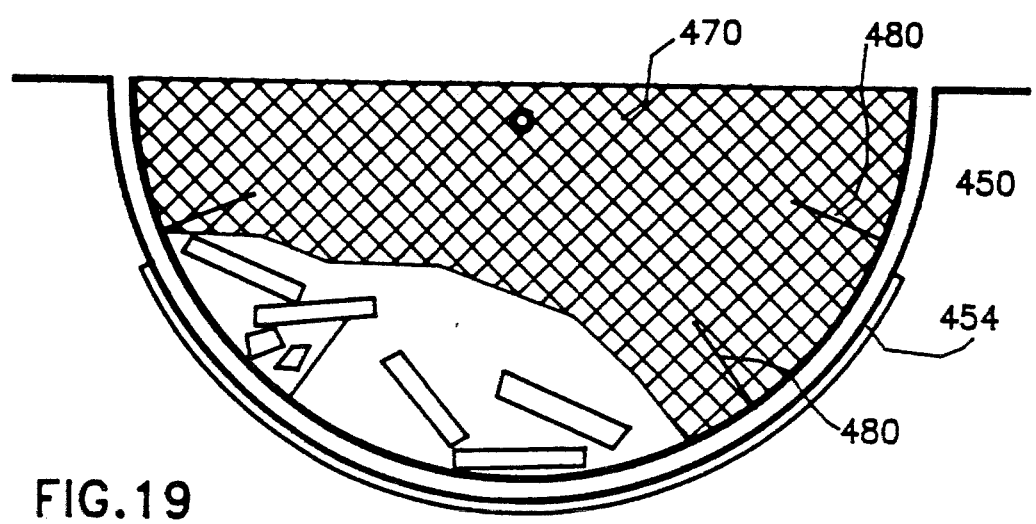

FIG. 19 illustrates a variation of the embodiment of FIGS. 18A-18D in which upstanding bulkhead elements 480 are formed on the interior of inner member 470 to limit sliding of the food products relative thereto.

Figure 20:
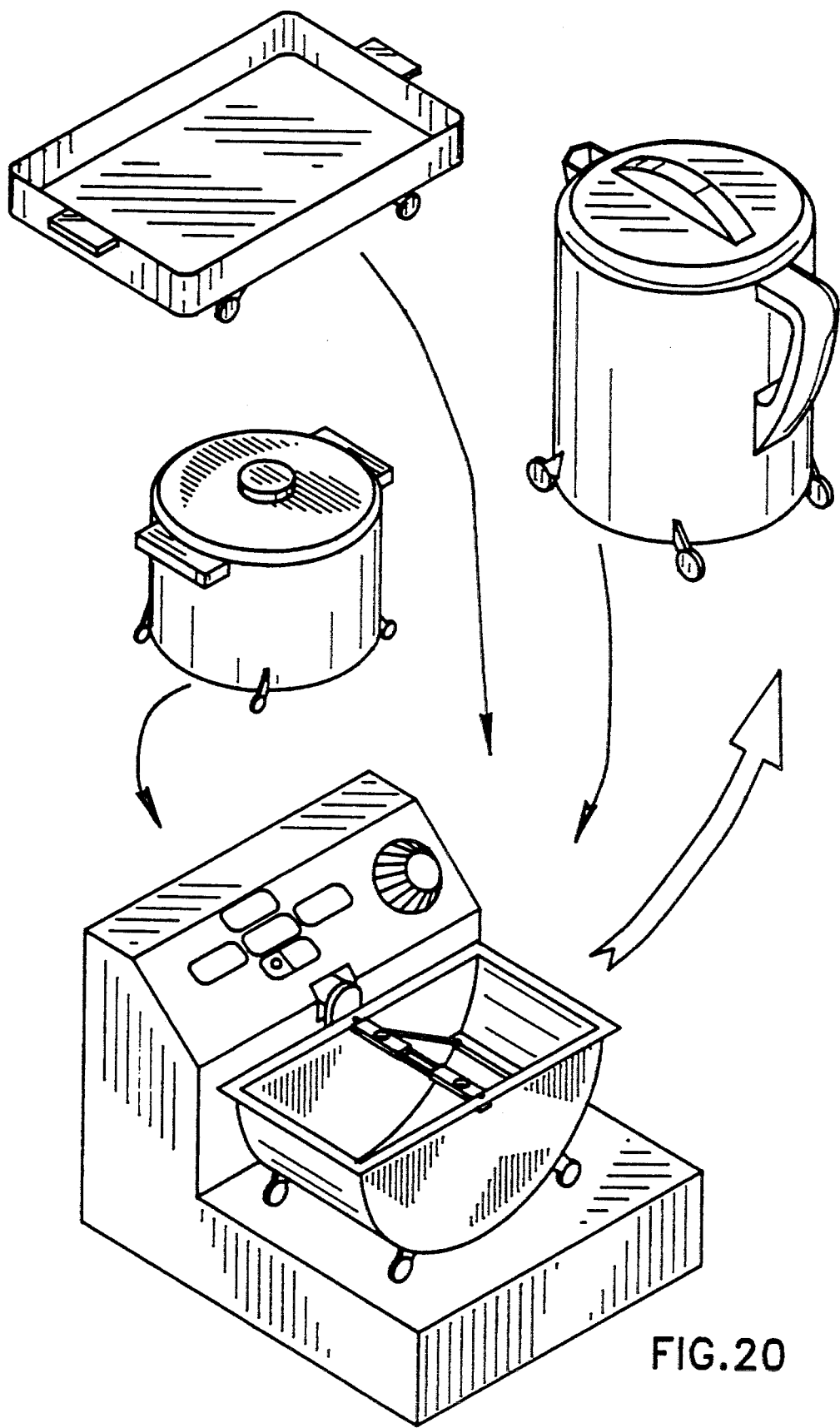
FIG. 20 is a pictorial illustration of the interchangeability of utensils on a single base in accordance with a preferred embodiment of the invention.

Reference is now made to FIG. 20, which illustrates graphically the interchangeability of a plurality of different types of cooking utensils with a single base, which may be flat, as illustrated, or curved. FIG. 20 serves to illustrate the use of both inductive and non-inductive heating.

It will be appreciated by persons skilled in the art that the present invention is not limited by what has been particularly shown and described hereinabove. It is specifically noted that features appearing in given embodiments may be combined to provide a combination which is not shown in any given illustrated embodiment. Rather the scope of the present invention is defined only by the claims which follow:

We claim:
1. A domestic cooking system comprising:
   a base defining at least one cooking location and comprising electromagnetic induction apparatus including an induction producing element operative to generate electromagnetic flux and at least one high permeability foil disposed so as to direct electromagnetic flux generated by the induction producing element to said at least one cooking location, and wherein said at least one high permeability foil is disposed beneath the induction producing element and has a thickness of less than 0.5 mm;

at least one cooking utensil defining a food heating surface and being operative to be heated by said electromagnetic flux at said cooking location; and automatically operative stirring apparatus arranged to undergo pivotal reciprocal motion about a pivot axis location generally at the center of a circle defined by said food heating surface for reciprocal motion along said food heating surface.

2. A domestic cooking system according to claim 1 and wherein said utensil is formed at least partially of an electrically conductive material.

3. A domestic cooking system according to claim 1 and wherein said base comprises at each cooking location apparatus for sensing the temperature of a cooking utensil in operative engagement therewith.

4. A domestic cooking system according to claim 1 and wherein said at least one foil is disposed on the opposite side of the inductive producing element from the utensil.

5. A domestic cooking system according to claim 1 and wherein said at least one foil is formed with a Curie temperature exceeding 250 degrees C.

6. A domestic cooking system according to claim 5 and wherein each of said at least one foil has a thickness and less than 0.05 mm.

7. A domestic cooking system according to claim 1 and wherein said at least one foil is formed with a Curie temperature exceeding 320 degrees C.

8. A domestic cooking system according to claim 1 and wherein each of said at least one foil has a thickness of less than 0.05 mm.

9. A domestic cooking system according to claim 1 and wherein said at least one foil is formed of an amorphous metal alloy.

10. A domestic cooking system according to claim 1 and wherein said induction producing element is non planar.

11. A domestic cooking system according to claim 10 and wherein said induction producing element comprises a plurality of induction coils.

12. A domestic cooking system according to claim 1 and wherein said induction producing element comprises a plurality of induction coils.

13. Apparatus according to claim 1 and also comprising apparatus for controlling the supply of heat to said heating surface in accordance with the temperature of said utensil.

14. Apparatus according to claim 13 and wherein said apparatus for controlling the supply of heat comprises apparatus for supplying heat until the temperature of the utensil exceeds the indicated desired temperature by a first threshold and thereafter supplying heat to maintain the difference between the temperature of the utensil and the indicated desired temperature within a second threshold.

15. Apparatus according to claim 13 and wherein said apparatus for controlling also comprises timing apparatus.

16. Apparatus according to claim 1 and wherein said stirring apparatus comprises stirring drive apparatus and a stirrer, said stirring drive apparatus including quick coupling apparatus for automatically coupling the stirring drive apparatus to said stirrer.

17. Apparatus according to claim 1 and wherein said utensil comprises a curved bottom surface having a generally circular configuration.

18. Apparatus according to claim 1 and wherein said stirring apparatus includes a stirring element having at least two generally planar surfaces which lie in planes which are angled with respect to each other and with respect to said bottom heating surface.

19. Apparatus according to claim 1 and also including an inner food holding element associated with said utensil for supporting food.

20. A domestic cooking system comprising:

a base defining at least one cooking location and comprising electromagnetic induction apparatus including an induction producing element operative to generate electromagnetic flux and at least one high permeability foil disposed so as to direct electromagnetic flux generated by the induction producing element to said at least one cooking location, and wherein said at least one high permeability foil is disposed beneath the induction producing element and has a thickness of less than 0.5 mm;

at least one cooking utensil including a curved bottom surface having a generally circular configuration and which defines a food heating surface and being operative to be heated by said electromagnetic flux at said cooking location; and automatically operative stirring apparatus comprising stirring drive apparatus and a stirrer, said stirring drive apparatus including quick coupling apparatus for automatically coupling the stirring drive apparatus to said stirrer.

21. Apparatus according to claim 20 and wherein said stirring apparatus is arranged to undergo pivotal reciprocal motion about a pivot axis location generally at the center of a circle defined by said bottom heating surface for reciprocal motion along said bottom heating surface.

22. A domestic cooking system according to claim 20 and wherein said base comprises at each cooking location apparatus for sensing the temperature of a cooking utensil in operative engagement therewith.

23. A domestic cooking system according to claim 20 and wherein said at least one foil is disposed on the opposite side of the induction producing element from the utensil.

24. A domestic cooking system according to claim 20 and wherein said at least one foil if formed with a Curie temperature exceeding 250 degrees C.

25. A domestic cooking system according to claim 20 and wherein said at least one foil is formed with a Curie temperature exceeding 320 degrees C.

26. A domestic cooking system according to claim 25 and wherein each of said at least one foil has a thickness of less than 0.05 mm.

27. A domestic cooking system according to claim 20 and wherein each of said at least one foil has a thickness of less than 0.05 mm.

28. A domestic cooking system according to claim 20 and wherein said at least one foil is formed of an amorphous metal alloy.

29. A domestic cooking system according to claim 20 and wherein said induction producing element is non planar.

30. A domestic cooking system according to claim 29 and wherein said induction producing element comprises a plurality of induction coils.

31. A domestic cooking system according to claim 20 and wherein said induction producing element comprises a plurality of induction coils.

32. Apparatus according to claim 20 and also comprising apparatus for controlling the supply of heat to said heating surface in accordance with the temperature of said utensil.

33. Apparatus according to claim 32 and wherein said apparatus for controlling the supply of heat comprises apparatus for supplying heat until the temperature of the utensil exceeds the indicated desired temperature by a first threshold and thereafter supplying heat to maintain the difference between the temperature of the utensil and the indicated desired temperature within a second threshold.

34. Apparatus according to claim 32 and wherein said apparatus for controlling also comprises timing apparatus.

35. A domestic cooking system comprising:
a base defining at least one cooking location and comprising electromagnetic induction apparatus including an induction producing element operative to generate electromagnetic flux and at least one high permeability foil disposed so as to direct electromagnetic flux generated by the induction producing element to said at least one cooking location, and wherein said at least one high permeability foil is disposed beneath the induction producing element and has a thickness of less than 0.5 mm;
at least one cooking utensil including a curved bottom surface having a generally circular configuration and which defines a food heating surface and being operative to be heated by said electromagnetic flux at said cooking location; and
automatically operative stirring apparatus comprising a stirring element having at least two generally planar surfaces which lie in planes which are angled with respect to each other and with respect to said bottom heating surface.

36. A domestic cooking system according to claim 35 and wherein each of said at least one foil has a thickness of less than 0.05 mm.

37. A domestic cooking system comprising:
a base defining at least one cooking location and comprising electromagnetic induction apparatus including an induction producing element operative to generate electromagnetic flux and at least one high permeability foil disposed so as to direct electromagnetic flux generated by the induction producing element to said at least one cooking location, and wherein said at least one high permeability foil is disposed beneath the induction producing element and has a thickness of less than 0.5 mm;
at least one cooking utensil which defines a food heating surface and being operative to be heated by said electromagnetic flux at said cooking location;
an inner food holding element associated with said at least one cooking utensil for supporting food; and
automatically operative stirring apparatus comprising stirring drive apparatus and a stirrer.

38. A domestic system according to claim 37 and wherein said base comprises at each cooking location apparatus for sensing the temperature of a cooking utensil in operative engagement therewith.

39. A domestic cooking system according to claim 37 and wherein said at least one foil is disposed on the opposite side of the induction producing element from the utensil.

40. A domestic cooking system according to claim 37 and wherein said at least one foil is formed with a Curie temperature exceeding 250 degrees C.

41. A domestic cooking system according to claim 37 and wherein said at least one foil is formed of an amorphous metal alloy.

42. Apparatus according to claim 37 and also comprising apparatus for controlling the supply of heat to said heating surface in accordance with the temperature of said utensil.

43. Apparatus according to claim 42 and wherein said apparatus for controlling the supply of heat comprises apparatus for supplying heat until the temperature of the utensil exceeds the indicated desired temperature by a first threshold and thereafter supplying heat to maintain the difference between the temperature of the utensil and the indicated desired temperature within a second threshold.

* * * * *